(12) United States Patent
Kruckenberg et al.

(10) Patent No.: US 8,962,130 B2
(45) Date of Patent: Feb. 24, 2015

(54) LOW DENSITY LIGHTNING STRIKE PROTECTION FOR USE IN AIRPLANES

(75) Inventors: Teresa M. Kruckenberg, La Mesa, CA (US); Valerie A. Hill, Villa Rica, GA (US); Anthony Michael Mazany, Amelica Island, FL (US); Eloise Young, Moreland Hills, OH (US); Song Chiou, Cerritos, CA (US)

(73) Assignee: Rohr, Inc., Charlotte, NC (US)

( * ) Notice: Subject to any disclaimer, the term of this patent is extended or adjusted under 35 U.S.C. 154(b) by 1378 days.

(21) Appl. No.: 12/282,305

(22) PCT Filed: Mar. 9, 2007

(86) PCT No.: PCT/US2007/063717
§ 371 (c)(1),
(2), (4) Date: Feb. 2, 2009

(87) PCT Pub. No.: WO2008/048705
PCT Pub. Date: Apr. 24, 2008

(65) Prior Publication Data
US 2009/0227162 A1    Sep. 10, 2009

Related U.S. Application Data

(60) Provisional application No. 60/781,093, filed on Mar. 10, 2006.

(51) Int. Cl.
*B32B 27/04* (2006.01)
*B64D 45/02* (2006.01)
*C09D 5/24* (2006.01)

(52) U.S. Cl.
CPC B64D 45/02 (2013.01); C09D 5/24 (2013.01); *Y10S 977/92* (2013.01); *Y10S 977/773* (2013.01);
(Continued)

(58) Field of Classification Search
USPC ............ 442/6, 204; 977/778, 785, 961; 428/367, 297.4; 922/920, 773, 775
See application file for complete search history.

(56) References Cited

U.S. PATENT DOCUMENTS

| 2,496,279 A | 2/1950 | Roberts et al. |
| 2,627,012 A | 1/1953 | Kinsella et al. |

(Continued)

FOREIGN PATENT DOCUMENTS

| CA | 1129512 | 8/1982 |
| CN | 101282834 A | 10/2008 |

(Continued)

OTHER PUBLICATIONS

JP 2003-239171 A (Toray Industries Inc.) Aug. 27, 2003 (abstract) [online] Patent Abstracts of Japan [retrieved on Apr. 19, 2011].

(Continued)

*Primary Examiner* — Elizabeth Cole
(74) *Attorney, Agent, or Firm* — Snell & Wilmer L.L.P.

(57) ABSTRACT

Surface films, paints, or primers can be used in preparing aircraft structural composites that may be exposed to lightning strikes. Methods for making and using these films, paints or primers are also disclosed. The surface film can include a thermoset resin or polymer, e.g., an epoxy resin and/or a thermoplastic polymer, which can be cured, bonded, or painted on the composite structure. Low-density electrically conductive materials are disclosed, such as carbon nanofiber, copper powder, metal coated microspheres, metal-coated carbon nanotubes, single wall carbon nanotubes, graphite nanoplatelets and the like, that can be uniformly dispersed throughout or on the film. Low density conductive materials can include metal screens, optionally in combination with carbon nanofibers.

5 Claims, 4 Drawing Sheets

(52) U.S. Cl.
CPC ........... *Y10S 977/775* (2013.01); *Y10S 977/778* (2013.01); *Y10S 977/785* (2013.01); *Y10S 977/961* (2013.01)
USPC ........ 428/297.4; 442/204; 428/367; 977/920; 977/773; 977/775; 977/778; 977/785; 977/961

(56) References Cited

U.S. PATENT DOCUMENTS

| | | | |
|---|---|---|---|
| 3,178,560 A | 4/1965 | Mapp et al. | |
| 3,266,005 A | 8/1966 | Balde et al. | |
| 3,349,359 A | 10/1967 | Morey | |
| 3,367,851 A | 2/1968 | Filreis et al. | |
| 3,385,959 A | 5/1968 | Ames et al. | |
| 3,397,302 A | 8/1968 | Hosferd | |
| 3,420,476 A | 1/1969 | Schultz et al. | |
| 3,495,328 A | 2/1970 | Ziver | |
| 3,657,516 A | 4/1972 | Fujihara | |
| 3,800,121 A | 3/1974 | Dean et al. | |
| 3,885,758 A | 5/1975 | Croswell, Jr. | |
| 3,935,422 A | 1/1976 | Barnes et al. | |
| 4,021,008 A | 5/1977 | Eichenauer | |
| 4,036,457 A | 7/1977 | Volkner et al. | |
| 4,062,917 A | 12/1977 | Hill et al. | |
| 4,250,397 A | 2/1981 | Gray et al. | |
| 4,291,079 A | 9/1981 | Hom | |
| 4,429,216 A | 1/1984 | Brigham | |
| 4,468,557 A | 8/1984 | Bylin et al. | |
| 4,473,740 A | 9/1984 | Ellis | |
| 4,514,619 A | 4/1985 | Kugelman | |
| 4,518,851 A | 5/1985 | Oppitz | |
| 4,522,889 A | 6/1985 | Ebneth et al. | |
| 4,534,886 A | 8/1985 | Kraus et al. | |
| 4,737,618 A | 4/1988 | Barbier et al. | |
| 4,743,740 A | 5/1988 | Adee | |
| 4,824,713 A | 4/1989 | Brick | |
| 4,826,108 A | 5/1989 | Briscoe et al. | |
| 4,837,618 A | 6/1989 | Hatori et al. | |
| 4,942,078 A | 7/1990 | Newman et al. | |
| 4,972,197 A | 11/1990 | McCauley et al. | |
| 4,983,814 A | 1/1991 | Ohgushi et al. | |
| 5,023,433 A | 6/1991 | Gordon | |
| 5,098,037 A | 3/1992 | Leffel et al. | |
| 5,192,605 A | 3/1993 | Mercuri et al. | |
| 5,225,265 A * | 7/1993 | Prandy et al. | 428/138 |
| 5,248,116 A | 9/1993 | Rauckhorst et al. | |
| 5,260,124 A | 11/1993 | Gaier | |
| 5,344,696 A | 9/1994 | Hastings et al. | |
| 5,351,918 A | 10/1994 | Giamati et al. | |
| 5,356,096 A | 10/1994 | Rauckhorst et al. | |
| 5,361,183 A | 11/1994 | Wiese | |
| 5,370,921 A | 12/1994 | Cedarleaf | |
| 5,397,618 A | 3/1995 | Cedarleaf | |
| 5,417,385 A | 5/1995 | Arnold et al. | |
| 5,424,054 A | 6/1995 | Bethune et al. | |
| 5,427,332 A | 6/1995 | Rauckhorst et al. | |
| 5,445,327 A | 8/1995 | Creehan | |
| 5,453,597 A | 9/1995 | McWilliams | |
| 5,470,413 A | 11/1995 | Cedarleaf | |
| 5,475,204 A | 12/1995 | Giamati et al. | |
| 5,566,892 A | 10/1996 | Creehan | |
| 5,584,450 A | 12/1996 | Pisarski | |
| 5,653,836 A | 8/1997 | Mnich et al. | |
| 5,657,951 A | 8/1997 | Giamati et al. | |
| 5,657,952 A | 8/1997 | Goldberg | |
| 5,747,161 A | 5/1998 | Iijima | |
| 5,765,779 A | 6/1998 | Hancock et al. | |
| 5,824,996 A | 10/1998 | Kochman et al. | |
| 5,846,356 A | 12/1998 | Vyakarnam et al. | |
| 5,853,877 A | 12/1998 | Shibuta | |
| 5,925,275 A | 7/1999 | Lawson et al. | |
| 5,934,617 A | 8/1999 | Rutherford et al. | |
| 5,942,140 A | 8/1999 | Miller et al. | |
| 5,947,418 A | 9/1999 | Bessiere et al. | |
| 5,971,323 A | 10/1999 | Bauch et al. | |
| 6,027,075 A | 2/2000 | Petrenko | |
| 6,031,214 A | 2/2000 | Bost et al. | |
| 6,054,690 A | 4/2000 | Petit et al. | |
| 6,094,907 A | 8/2000 | Blackner | |
| 6,137,083 A | 10/2000 | Bost et al. | |
| 6,145,787 A | 11/2000 | Rolls | |
| 6,194,685 B1 | 2/2001 | Rutherford et al. | |
| 6,227,492 B1 | 5/2001 | Schellhase et al. | |
| 6,237,874 B1 | 5/2001 | Rutherford et al. | |
| 6,265,466 B1 | 7/2001 | Glatkowski et al. | |
| 6,279,856 B1 | 8/2001 | Rutherford et al. | |
| 6,328,258 B1 | 12/2001 | Porte | |
| 6,330,986 B1 | 12/2001 | Rutherford et al. | |
| 6,338,455 B1 | 1/2002 | Rauch et al. | |
| 6,371,242 B1 | 4/2002 | Wilson et al. | |
| 6,403,935 B2 | 6/2002 | Kochman et al. | |
| 6,427,946 B1 | 8/2002 | Petrenko | |
| 6,483,087 B2 | 11/2002 | Gardner et al. | |
| 6,521,873 B1 | 2/2003 | Cheng et al. | |
| 6,576,115 B2 | 6/2003 | Petrenko | |
| 6,639,381 B2 | 10/2003 | Tamura et al. | |
| 6,653,598 B2 | 11/2003 | Petrenko | |
| 6,680,016 B2 | 1/2004 | Wang et al. | |
| 6,682,677 B2 | 1/2004 | Lobovsky et al. | |
| 6,706,402 B2 | 3/2004 | Rueckes et al. | |
| 6,725,542 B1 | 4/2004 | Maguire | |
| 6,730,892 B2 | 5/2004 | Suda et al. | |
| 6,762,237 B2 | 7/2004 | Glatkowski et al. | |
| 6,770,848 B2 | 8/2004 | Haas et al. | |
| 6,783,746 B1 | 8/2004 | Zhang et al. | |
| 6,835,591 B2 | 12/2004 | Rueckes et al. | |
| 6,848,656 B2 | 2/2005 | Linton | |
| 6,870,139 B2 | 3/2005 | Petrenko | |
| 6,917,021 B2 | 7/2005 | Kano et al. | |
| 6,939,525 B2 | 9/2005 | Colbert et al. | |
| 6,979,709 B2 | 12/2005 | Smalley et al. | |
| 6,986,853 B2 | 1/2006 | Glatkowski et al. | |
| 7,026,432 B2 | 4/2006 | Charati et al. | |
| 7,029,603 B2 | 4/2006 | Wang et al. | |
| 7,034,257 B2 | 4/2006 | Petrenko | |
| 7,047,725 B2 | 5/2006 | Moe et al. | |
| 7,049,353 B2 | 5/2006 | Conroy et al. | |
| 7,060,241 B2 | 6/2006 | Glatkowski | |
| 7,078,658 B2 | 7/2006 | Brunner et al. | |
| 7,105,596 B2 | 9/2006 | Smalley et al. | |
| 7,118,693 B2 | 10/2006 | Glatkowski et al. | |
| 7,152,829 B2 | 12/2006 | Bertolotti et al. | |
| 7,153,452 B2 | 12/2006 | Ogale et al. | |
| 7,157,663 B1 | 1/2007 | Kizmartan | |
| 7,198,745 B2 | 4/2007 | Newman et al. | |
| 7,211,772 B2 | 5/2007 | Carpin, II | |
| 7,220,484 B2 | 5/2007 | Ton-That et al. | |
| 7,229,683 B2 | 6/2007 | Fischer et al. | |
| 7,259,358 B2 | 8/2007 | Mariner et al. | |
| 7,273,661 B2 | 9/2007 | Moriyama et al. | |
| 7,378,040 B2 | 5/2008 | Luo et al. | |
| 7,408,186 B2 | 8/2008 | Merkulov et al. | |
| 7,485,678 B2 | 2/2009 | Ohashi et al. | |
| 7,588,212 B2 | 9/2009 | Moe et al. | |
| 7,601,421 B2 | 10/2009 | Khabashesku et al. | |
| 7,645,400 B2 | 1/2010 | Saitoh | |
| 7,729,100 B2 | 6/2010 | Gonzalez et al. | |
| 7,832,983 B2 | 11/2010 | Kruckenberg et al. | |
| 7,927,701 B2 | 4/2011 | Curliss et al. | |
| 2002/0035170 A1 | 3/2002 | Glatkowski et al. | |
| 2002/0096506 A1 | 7/2002 | Moreland et al. | |
| 2002/0153367 A1 | 10/2002 | Haas | |
| 2002/0175152 A1 | 11/2002 | Petrenko | |
| 2002/0180077 A1 * | 12/2002 | Glatkowski et al. | 264/36.1 |
| 2003/0008123 A1 | 1/2003 | Glatkowski et al. | |
| 2003/0122111 A1 | 7/2003 | Glatkowski | |
| 2003/0133865 A1 | 7/2003 | Smalley et al. | |
| 2003/0155467 A1 | 8/2003 | Petrenko | |
| 2003/0164427 A1 | 9/2003 | Glatkowski et al. | |
| 2003/0222077 A1 | 12/2003 | Suda et al. | |
| 2003/0234248 A1 | 12/2003 | Kano et al. | |
| 2004/0065659 A1 | 4/2004 | Tse | |
| 2004/0069772 A1 | 4/2004 | Kondo et al. | |
| 2004/0071949 A1 | 4/2004 | Glatkowski et al. | |
| 2004/0071990 A1 | 4/2004 | Moriyama | |

(56) References Cited

U.S. PATENT DOCUMENTS

| | | | |
|---|---|---|---|
| 2004/0074899 A1 | 4/2004 | Mariner et al. | |
| 2004/0096388 A1 | 5/2004 | Ogale et al. | |
| 2004/0237502 A1 | 12/2004 | Moe et al. | |
| 2004/0241410 A1 | 12/2004 | Fischer et al. | |
| 2004/0265550 A1 | 12/2004 | Glatkowski et al. | |
| 2005/0006529 A1 | 1/2005 | Moe et al. | |
| 2005/0031843 A1 | 2/2005 | Robinson et al. | |
| 2005/0069701 A1 | 3/2005 | Watanabe et al. | |
| 2005/0074569 A1 | 4/2005 | Lobovsky et al. | |
| 2005/0127329 A1 | 6/2005 | Wang et al. | |
| 2005/0178924 A1 | 8/2005 | Bertolotti | |
| 2005/0189345 A1 | 9/2005 | Brunner et al. | |
| 2005/0191493 A1 | 9/2005 | Glatkowski | |
| 2005/0209392 A1 | 9/2005 | Luo et al. | |
| 2005/0221016 A1 | 10/2005 | Glatkowski et al. | |
| 2005/0230560 A1 | 10/2005 | Glatkowski et al. | |
| 2005/0233127 A1 | 10/2005 | Steffier | |
| 2006/0032983 A1 | 2/2006 | Brand et al. | |
| 2006/0043240 A1 | 3/2006 | Hindal et al. | |
| 2006/0052509 A1 | 3/2006 | Saitoh | |
| 2006/0057290 A1 | 3/2006 | Glatkowski et al. | |
| 2006/0058443 A1 | 3/2006 | Ohashi et al. | |
| 2006/0060825 A1 | 3/2006 | Glatkowski et al. | |
| 2006/0078705 A1 | 4/2006 | Glatkowski et al. | |
| 2006/0113510 A1 | 6/2006 | Luo et al. | |
| 2006/0135677 A1 | 6/2006 | Huang et al. | |
| 2006/0155043 A1 | 7/2006 | Johnson et al. | |
| 2006/0166003 A1 | 7/2006 | Khabashesku et al. | |
| 2006/0207931 A1* | 9/2006 | Liang et al. | 210/500.21 |
| 2006/0217482 A1 | 9/2006 | Lukehart et al. | |
| 2006/0249711 A1 | 11/2006 | Niu et al. | |
| 2007/0131915 A1 | 6/2007 | Stankovich et al. | |
| 2007/0265379 A1* | 11/2007 | Chen et al. | 524/404 |
| 2007/0298669 A1 | 12/2007 | Barrera et al. | |
| 2008/0020193 A1 | 1/2008 | Jang et al. | |
| 2008/0063875 A1 | 3/2008 | Robinson et al. | |
| 2008/0145528 A1 | 6/2008 | Deng et al. | |
| 2008/0166563 A1 | 7/2008 | Brittingham et al. | |
| 2008/0176983 A1 | 7/2008 | Niu et al. | |
| 2008/0248275 A1 | 10/2008 | Jang et al. | |
| 2008/0257015 A1 | 10/2008 | Lukehart et al. | |
| 2009/0068461 A1 | 3/2009 | Reneker et al. | |
| 2009/0140098 A1 | 6/2009 | Lengsfeld et al. | |
| 2009/0176112 A1 | 7/2009 | Kruckenberg et al. | |
| 2009/0186214 A1 | 7/2009 | Lafdi et al. | |
| 2009/0227162 A1 | 9/2009 | Kruckenberg et al. | |
| 2011/0017867 A1 | 1/2011 | Simmons et al. | |

FOREIGN PATENT DOCUMENTS

| | | |
|---|---|---|
| CN | 101466598 A | 6/2009 |
| DE | 162009 | 1/1919 |
| DE | 1615123 | 5/1970 |
| DE | 2832119 | 2/1979 |
| DE | 2832119 | 8/1979 |
| EP | 0680878 | 11/1995 |
| EP | 1109218 | 6/2001 |
| EP | 1109218 | 2/2003 |
| EP | 1600469 | 11/2005 |
| EP | 1699469 A | 11/2006 |
| EP | 1865150 A1 | 12/2007 |
| FR | 72.12275 | 11/1972 |
| GB | 1117843 | 6/1968 |
| GB | 1247071 | 9/1971 |
| GB | 1314162 | 4/1973 |
| GB | 2155062 | 9/1985 |
| GB | 2243412 | 10/1991 |
| GB | 2258095 | 1/1993 |
| GB | 2259287 | 3/1993 |
| JP | 60072732 A | 9/1983 |
| JP | 60-072732 | 4/1985 |
| JP | 02110196 A | 10/1988 |
| JP | 2-110196 | 4/1990 |
| JP | 05140486 A | 11/1991 |
| JP | 06036853 | 7/1992 |
| JP | 5-140486 A | 6/1993 |
| JP | 6-36853 | 2/1994 |
| JP | 2002080617 A | 9/2000 |
| JP | 2003136634 | 10/2001 |
| JP | 2002 080617 A | 3/2002 |
| JP | 2003 136634 | 5/2003 |
| JP | 2003 136634 A | 5/2003 |
| JP | 2003 239171 | 8/2003 |
| JP | 2003238698 A | 8/2003 |
| WO | WO00/33614 | 4/1973 |
| WO | WO 91/11891 | 8/1991 |
| WO | WO91/11891 | 8/1991 |
| WO | WO 96/28258 | 9/1996 |
| WO | WO 00/33614 | 6/2000 |
| WO | WO 02/076430 | 10/2002 |
| WO | WO02/076430 | 10/2002 |
| WO | WO 03/062056 | 7/2003 |
| WO | WO03/062056 | 7/2003 |
| WO | WO 03/069955 | 8/2003 |
| WO | WO03/069955 | 8/2003 |
| WO | WO03/076703 | 9/2003 |
| WO | WO 03/076703 | 9/2003 |
| WO | WO 2004/001107 | 12/2003 |
| WO | WO2004/001107 A | 12/2003 |
| WO | WO 2005/020635 | 3/2005 |
| WO | WO2005/020635 | 3/2005 |
| WO | WO 2005/028174 | 3/2005 |
| WO | WO2005/028174 A | 3/2005 |
| WO | WO 2005/044723 | 5/2005 |
| WO | WO 2005/055930 | 6/2005 |
| WO | WO 2006/008518 | 1/2006 |
| WO | WO2006/008518 A | 1/2006 |
| WO | WO 2007/130979 | 11/2007 |
| WO | WO 2007/136613 | 11/2007 |
| WO | 2008048705 A3 | 4/2008 |
| WO | WO 2008/056123 | 5/2008 |
| WO | 2009118509 A1 | 10/2009 |

OTHER PUBLICATIONS

English translation of Chinese Office Action (CN 2011042100537450), dated Apr. 26, 2011, pp. 1-10.

Review of Aero-Engine Development, Guang Chen, Aeronautical Manufacturing Technology, 2000 (6), dated Dec. 31, 2000, pp. 1-5.

English translation of Review of Aero-Engine Development, Guang Chen, Aeronautical Manufacturing Technology, 2000 (6), dated Dec. 31, 2000, pp. 1-9.

Combined Search and Examination Report, Application No. GB0725083.0, Mar. 31, 2008, pp. 1-5, UK Intellectual Property Office.

R.E. Evans, D.E. Hall and B.A. Luxon, Nickel Coated Graphite Fiber Conductive Composites, SAMPE Quarterly, vol. 17, No. 4, Jul. 1986.

Takesue, I. et al, Superconductivity in Entirely End-Bonded Multiwalled Carbon Nanotubes, Feb. 10, 2006, pp. 1-4, PRL 96,057001 (2006), The American Physical Society.

European Search Report, Application No. 06005409.5-2315, dated Oct. 5, 2006, pp. 1-7, European Patent Office.

Extended Search Report, EP Application No. 06005410.3-2315, dated Jun. 7, 2006, pp. 1-13, European Patent Office.

Miller and Harris, The Carbon Nanotube Patent Landscape, Nanotechnology Law & Business, Dec. 2006, pp. 427-454.

Fielding et al, Nanocomposites for Lightning Strike Protection, U.S. Government, pp. 1-14, known as of Oct. 31, 2007.

Search Report, Application No. GB0725083.0 Sep. 16, 2008, pp. 1-2, UK Intellectual Property Office.

Search Report, Application No. PCT/US2007/063717, Sep. 10, 2008, pp. 1-5, European Patent Office.

English translation of JP 2003239171, published Aug. 27, 2003, pp. 1-12.

JP 2003-136634 A (Tanimoto, T.) May 14, 2003 (abstract) [online] EPODOC/EPO, Thomson Scientific World Patents Index Research service [retrieved on Sep. 16, 2008].

EP Examination Report (EP 07761682.9), dated May 24, 2011, pp. 1-4.

EP Office Action (EP 08019213.1), dated May 24, 2011, pp. 1-4.

(56) References Cited

OTHER PUBLICATIONS

Chinese Office Action (CN 200780025247.7), dated Dec. 3, 2010, pp. 1-4.
English translation of Chinese Office Action (CN 200780025247.7), dated Dec. 3, 2010, pp. 1-5.
New Science: Mr. Know-All, Volume of Engineering and Technology, Edited in chief by Yu, Zuyuan, 1997(8), p. 164, published Aug. 31, 1997, pp. 1-2.
English translation of New Science: Mr. Know-All, Volume of Engineering and Technology, Edited in chief by Yu, Zuyuan, 1997(8), p. 164, published Aug. 31, 1997, p. 1.
Basic Modern Chemistry, Edited by Li, Guifang, et al., 2004(9), p. 172, published Sep. 30, 2004, pp. 1-2.
English translation of Basic Modern Chemistry, Edited by Li, Guifang, et al., 2004(9), p. 172, published Sep. 30, 2004, pp. 1-3.
Chinese Office Action (CN 200780016863.6), dated Apr. 26, 2011, pp. 1-4.
English translation of Chinese Office Action (CN 200780016863.6), dated Apr. 26, 2011, pp. 1-4.
EP Office Action (EP 07863328.6), dated May 26, 2011, pp. 1-3.
EP Office Action (EP 11000543.6), dated Aug. 9, 2011, pp. 1-5.
EP 06005409.5-2315—Search Report dated May 10, 2006, pp. 1-7, EPO.
EP 06005410.3-2315—Extended Search Report dated Jul. 6, 2006, pp. 1-13, European Patent Office.
EP 08019213.1—Extended Search Report dated Dec. 19, 2008.
GB 0725083—Combined Search and Examination Report dated Mar. 31, 2008, pp. 1-5, UK Intellectual Property Office.
GB 0725083.0—Search Report dated Sep. 16, 2008, pp. 1-2, UK Intellectual Property Office.
PCT/US2007/063717—Search Report dated Sep. 10, 2008, pp. 1-5, European Patent Office.
PCT/US2007/063717—International Preliminary Report on Patentability dated Dec. 31, 2008.
PCT/US2007/067934—International Preliminary Report on Patentability dated Nov. 13, 2008.
PCT/US2007/067934—International Search Report and Written Opinion ISA/EP dated Oct. 31, 2007.
Sarah Black, "Filament winding with large tow carbon fiber", High Performance Composites Sourcebook 2006, May 2005, pp. 1-4.
O. Breuer et al "Big Returns From Small Fibers: A Review of Polymer/Carbon Nanotube Composites" Polymer Composites, Dec. 2004, vol. 25, No. 6, pp. 630-645.
Ron Brewer "Evaluating Lightning Suscefdcdptibility" (EMC Test), Entrepreneur.com, Jul. 2008.
Daniel T. Colbert, Single-Wall Nanotubes: A New Option for Conductive Plastics and Engineering Polymers, Plastics Additives & Compounding (Jan./Feb. 2003).
R.E. Evans et al, Nickel Coated Graphite Fiber Composites, SAMPE Quarterly, vol. 17, No. 4, Jul. 1986.
Ginger Gardiner "Lightning Strike Protection for Composite Structures" High Performance Composites, Jul. 1, 2006.
M. Jose et al, "Synthesis and processing of aligned carbon nonotube based fibers" SAMPE Symposium, May 2003, pp. 1-5.
Franz Kreupl et al "Microelectronic Interconnects based on carbon nanotubes" Condensed Matter, Materials Science, Oct. 25, 2004.
Zhiyong Liang et al "PD262 Investigation of Thermal Conductivity of Carbon Nanotube Buckypapers and Nanocomposities", SAMPE Symposium, May 2005, pp. 1-9.
J.A. Pontecorvo, "Protection of Airplane Fuel Systems Against fuel Vapor Ignition Due to Ligntning" Federal Aviation Administration, Advisory Circular, Apr. 12, 1985, AC No. 20-53.
Edward J. Rupke "What happens when lightning strikes an airplane?", Scientific American, Aug. 14, 2008.
D. Shi et al "Magnetic Alignment of Carbon Nanofibers in Polymer Composites and Anisotropy of Mechanical Properties", J. Appl. Phys., 97 (064312): 1-5(2005).
Takesue et al, Superconductivity in Entirely End-Bonded Multiwalled Carbon Nanotubes, Feb. 10, 2006, pp. 1-4, PRL 96,057001 (2006), The American Physical Society.
Kenneth B. K. Teo et al, Catalytic synthesis of carbon nanotubes and nanofibers In: Nalwa, H.S., (ed.) Encyclopedia of Nanoscience and Nanotechnology (2003) American Scientific Publishers, Stevenson Ranch, CA, USA, pp. 665-686. ISBN 1588830012.
Nick Titchenal et al "SWNT and MWNT Reinforced Carbon Nanocomposite Fibrils", 36th International SAMPE Technical Conference, Nov. 2004, pp. 1-11.
Namiko Yamamoto et al, "Electrical and thermal properties of hybrid woven composites reinforced with aligned carbon nanotubes," in Proceedings of the 49th AIAA/ASME/ASCE/AHS/ASC Structures, Structural Dynamics, and Materials Conference, Schaumburg, Ill., USA, Apr. 2008.
Official Action dated Mar. 1, 2012 (Chinese Application No. 200780016863.6), 3 pgs.
English translation of Official Action dated Mar. 1, 2012 (Chinese Application No. 200780016863.6), 4 pgs.
Official Action dated Dec. 21, 2011 (Chinese Application No. 200780025247.7), 3 pgs.
English translation of Official Action dated Dec. 21, 2011 (Chinese Application No. 200780025247.7), 4 pgs.
Official Action issued Nov. 18, 2011, (JP App. No. 2009510028, filed Nov. 4, 2008), pp. 1-2.
English translation of Official Action issued Nov. 18, 2011, (JP App. No. 2009510028, filed Nov. 4, 2008), pp. 1-3.
Third Party Observations document submitted by N. N. Interested Party to the European Patent Office regarding EP Patent Application No. EP08019213.1, dated Oct. 18, 2011, 6 pgs.
Third Party Observations document submitted by N. N. Interested Party to the European Patent Office regarding EP Patent Application No. EP08019213.1, dated Aug. 1, 2012, 7 pgs.
Official Chinese action for Application No. 200780025247.7, dated Jul. 30, 2012, 5 pgs.
English translation of Official Chinese action for Application No. 200780025247.7, dated Jul. 30, 2012, 5 pgs.
Official Chinese action for Application No. 201010270037.8, dated Dec. 5, 2012, 5 pgs.
English translation of Official Chinese action for Application No. 201010270037.8, dated Dec. 5, 2012, 7 pgs.
Official U.S. action for U.S. Appl. No. 12/549,871, dated Dec. 5, 2012, 9 pgs.
Official Chinese Action for Application No. 200910007352.9, dated Jun. 12, 2012, 8 pgs.
English translation of Official Chinese Action for Application No. 200910007352.9, dated Jun. 12, 2012, 10 pgs.
Official Japanese Action for Application No. 2009-510028, dated Jul. 20, 2012, 3 pgs.
English translation of Official Japanese Action for Application No. 2009-510028, dated Jul. 20, 2012, 4 pgs.
Official Action of U.S. Appl. No. 12/410,996, dated Aug. 2, 2012, 15 pgs.
English Patent Abstract of Japanese Publication No. 2003-238698, dated Aug. 27, 2003, 1 pg.
Official Chinese Action for Application No. 200780016863.6, dated May 3, 2012, 3 pgs.
English translation of Official Chinese Action for Application No. 200780016863.6, dated May 3, 2012, 4 pgs.
Official Action for U.S. Appl. No. 12/410,996, dated Jun. 8, 2011, 13 pgs.
Official Action for U.S. Appl. No. 12/549,871, dated Apr. 26, 2012, 8 pgs.
English Translation of Japanese Patent Publication No. 2003-238698A, dated Aug. 27, 2003, 8 pgs.

* cited by examiner

ARMCHAIR (α = 30°)

ZIGZAG (α = 0°)

INTERMEDIATE (0< α = 30°)

LOW DENSITY LIGHTNING STRIKE PROTECTION FOR USE IN AIRPLANES

This application is a 371 of PCT/US2007/063717.

BACKGROUND OF THE INVENTION

The outer surface of an aircraft fuselage is typically prepared from composites, aluminum and/or steel. When prepared from aluminum or steel, the aircraft has a highly conductive path, like a Faraday cage, and the current can pass from the entry point of the strike across the skin to the exit point without greatly damaging the airplane. However, particularly with modern aircraft (and aircraft components), composite materials are being increasingly used to lower the weight of the aircraft. These materials often include carbon or graphite fibers, and the materials do not provide equivalent protection when compared with an all metal structure due to the lower electrical conductivity of the carbon or graphite.

Currently, lightning strike protection for composite materials, such as those used in aircraft construction, uses expanded metal screens (mesh) embedded in surface film attached on a composite surface to dissipate the energy incurred by a strike. The screens can be embedded in surface films or applied separately. U.S. Pat. No. 5,470,413 discusses a process for embedding a screen into a surface film. U.S. Pat. No. 5,417,385 discusses the fabrication of a structure with a lightning strike protective layer. Sometimes an extra layer of surface film is used to ensure a smooth surface for painting and to prevent microcracking. An extra fiberglass isolation ply can also be used if aluminum is used for the screen to prevent galvanic corrosion.

The aircraft and aerospace industry use certain composite structures to provide lightning strike protection. One such composite uses a 0.040 lb/ft2 (186 grams/m2 (gsm)) areal density copper screen, embedded in or placed on the surface of the component to be protected. A 0.030 lb/ft2 (140 gsm) areal density surface film (surface films are usually an adhesive or epoxy resin with fillers and modifiers) is usually cured with the composite structure and copper screen, resulting in a 0.070 lb/ft2 (326 gsm) areal density combination. However, due to concerns over the surface film microcracking, an additional layer of adhesive is sometimes added. The resulting areal density is around 0.10 lb/ft2 (466 gsm). Another composite structure employs a 0.016 lb/ft2 (74 gsm) areal density aluminum screen, which is placed on the surface of the component to be protected. A 0.05 lb/ft2 (232 gsm) surface film is placed over the aluminum screen. If the material of the component is a carbon composite, the aluminum screen also requires a fiberglass isolation layer, typically 0.091 lb/ft2 (423 gsm). The isolation layer is provided to prevent galvanic corrosion with the underlying carbon composite, and it also assists in lightning strike protection since aluminum is not as conductive as copper. The total areal density of this composite structure is 0.157 lb/ft2 (730 gsm).

There is an interest in reducing the density of lightning strike protection materials. Research in this area has focused on using metal particles, foils, and/or screens. Examples include copper powder, applied in the form of a paint, and copper screen, embedded in an epoxy or other polymer coating layer. In some embodiments, these materials provided adequate protection against lightning strikes. However, at least in part due to the difference in the coefficients of thermal expansion (CTE's) between the metal particles/screens and polymers, these materials may microcrack during the thermal cycling conditions experienced by an airplane under flight conditions. That is, at high altitudes, the airplane (and lightning strike protection materials) experiences relatively low temperatures, and on the ground, the airplane is exposed to relatively higher temperatures. The change in temperatures can be extreme, and can result in microcracking if the conductive material and the polymer used in the lightning strike protection materials have significantly different CTE's. This microcracking can lead to moisture or chemical ingress into the composite structure resulting in the potential for a reduction in mechanical properties of the structure.

It would be advantageous to provide lightning strike protection materials with a density lower than currently used lightning strike protection materials, and which is capable of surviving the thermal cycling to which an airplane is exposed under conditions of use. The present invention provides such lightning strike protection materials, aircraft and aircraft components including these materials, and methods for preparing these materials. For purposes of this invention, the term "aircraft components" is intended to include the various parts of an aircraft, including without limitation, the fuselage portion of the aircraft, the aircraft's various control surfaces (such as flaps, slats, tail, etc.), and the aircraft propulsion system and its various components (the engine, nacelle, pylori, etc.).

SUMMARY OF THE INVENTION

Lightning strike protection materials, methods for their preparation and use, are disclosed. Composite materials including an uppermost layer of a lightning strike protection layer formed from the materials, which composite materials are used to form part of the exterior of an aircraft and aircraft components comprising the composite materials, are also disclosed.

The lightning strike protection material is produced by applying one or more of a primer, paint, film, or adhesive layer to the exterior of an aircraft or individual aircraft components, where the primer, paint, film, or adhesive layer includes low density conductive nanoparticles in a polymer-containing carrier. The low density conductive nanoparticles are distributed throughout the polymer-containing carrier, ideally in a substantially homogenous fashion.

Ideally, the polymer-containing carrier includes a thermoset and/or thermoplastic polymer, or, before being cured, a monomer which forms a thermoset polymer. One example of a suitable polymer is an epoxy resin which, when cured, forms a thermoset polymer on the surface to which it is applied. In use, the material is applied as the top layer of a metal or composite material used to form structural elements of an airplane, which may optionally include an overcoat of primer and/or paint.

The low density conductive nanoparticles can include one or more of a variety of such materials, including carbon nanotubes, carbon nanofibers, metal nanowires, metal powders, metal coated glass or polymeric microspheres, and the like. Use of a film layer can provide higher loadings of the conductive nanoparticles than a primer or paint layer, and, thus, can provide higher levels of lightning strike protection.

In one aspect of the invention, the materials include a combination of metal powders, such as copper powder, and carbon nanotubes or nanofibers, which are also known as a type of multi-walled carbon nanotubes (collectively, carbon nanotubes, unless referred to differently for particular applications), and a polymer-containing carrier. The carrier can be in the form of a paint, a primer, or a polymer coating layer (such as a surface film or adhesive). The combination of metal powders and carbon nanotubes accomplishes at least two objectives. First, one can obtain substantially the same lightning strike protection as with the metal powders alone, but with less overall density. Second, the blend of carbon nanotubes and metal powders produces a layer with a coefficient of thermal expansion (CTE) that can more closely approximate that of the underlying layer than a layer with only metal powders or carbon nanotubes. The closer the CTE of the layer is to the underlying layer, the less likelihood of delamination when the layer is subjected to the types of temperature swings an aircraft is subjected to under normal operation.

In this aspect, the metal powder typically has a particle size in the range of 4 nm to 100 μm. The particles are ideally sized to provide adequate electrical properties (i.e., conductivity) for use as a lightning strike protection material. The particles can be irregular in shape or, smooth and round, or have texture. One example of a suitable textured particle is a "spiky" copper powder where the carbon nanotubes are embedded into the copper. While not wishing to be bound by a particular theory, it is believed that the presence of the carbon nanotubes brings the CTE of the polymer closer to that of the metal powder, such that the material can survive the thermal cycling conditions associated with the conditions under which an airplane is subjected in flight.

The ratio, by weight, of metal powder, such as a copper powder, to metal powder/carbon nanotubes combined can range from about 0.2 to about 0.999. The weight ratio of the metal powder/carbon nanotubes to polymer can range from about 0.1 to about 0.8. The concentration of carbon nanotube/metal powder is sufficient such that the surface resistivity of the airplane to which the material is applied is low enough to dissipate the energy from a lightning strike without damage to the plies beneath (i.e., the plies in the composite material underlying the lightning strike protection layer).

The composite material can include one or more layers of paint, primer, and/or film including the metal powders/carbon nanotubes, and can optionally include an isolation ply, particularly where the resistivity of the material is not sufficiently low to provide adequate protection without the use of such an isolation ply.

In another aspect of the invention, a low-density metal screen, such as a copper screen (i.e., with a density of around 0.03 lb/ft2), can be reinforced with carbon nanotubes (CNT) or graphite nanoplatelets in a polymer film (i.e., with a density of around 0.02 lb/ft2). In this aspect, the materials are in the form of a film, but not a paint or primer. The carbon nanotubes can be present in as little as around 1% by weight of the surface film. The CNT weight can be optimized to match the copper screen CTE to minimize microcracking and allow the use of a lighter surface film. This combination can be used to provide a lightning strike protection system with an areal density of around 0.05 lb/ft2. A lower density metal screen can also be used with a combination of metal powder and carbon nanotubes or graphite nanoplatelets in a polymer film.

In another aspect of the invention, the lightning strike material comprises metal coated, for example, silver-coated, hollow glass microspheres and/or metal-coated carbon nanotubes (collectively, silver particles). While not wishing to be bound by a particular theory, it is believed that the metal coating helps with the dispersion of the particles within the film, primer or paint. In one embodiment, a silver coating is applied onto carbon nanotubes by electroless plating, which is believed to improve the interfacial adhesion of the composites to which the material is applied. The metal-coated particles can be subjected to pretreatments such as oxidation, sensitizing treatment and activation treatment, which can introduce various functional groups on the particles. These functional groups can improve the dispersion of the particles into the paint, primer or film, increase the number of activated sites, and lower the deposition rate, i.e., how much material needs to be applied to achieve adequate conductivity to provide lightning strike protection. The use of microspheres with a metal coating can help maintain the metal in dispersion in the paint, as the density of the metal coated microspheres is similar to the density of the paint, whereas metal powders tend to be denser than paint.

For most aspects, multiple layers can be used to achieve a desired lightning protection effect. For example, the composite material can include one or more layers of metal coated particles, such as silver-coated particles, and a fiberglass isolation ply and/or a layer of carbon nanotubes.

In another aspect, carbon nanotubes only can be added to the polymer film, paint or primer. Since the 10,10 armchair configuration carbon nanotube has a resistivity close to copper and it is six times lighter than copper, it has the highest potential for weight reduction in a lightning strike protection system. The nanotubes may be aligned through various methods. Mechanical, chemical, and magnetic methods can be investigated to align the nanotubes. For example, the nanotubes can be mixed with the adhesive and extruded into a film coating to achieve approximately 20% of the tubes in alignment. The feed screw can be vibrated to improve the alignment of nanotubes in the flow direction (similar to vibration injection molding used with recycled thermoplastics). The nanotubes can be functionalized to react with the tail or head of each nanotube such that it will self-assemble (similar to lipid bi-layer assembly). However, this embodiment would require optimizing the nanotube loading so that the nanotubes attract each other, while also ensuring that the epoxy groups do not react with the functional groups on the nanotubes. Finally, the nanotubes can be made such that a nickel particle is attached to one end. Ferrous alloy nanoparticles and carbon nanotubes (with the nickel particle) can be added to the adhesive, primer, or paint and subjected to a magnetic field to align the nanotubes.

In another aspect, graphite nanoplatelets (20 to 60% by weight) that have been oriented in-plane are used to replace the metal screen used in conventional lightning strike protection materials. In this aspect, the materials are in the form of a film, paint or primer. The platelets can be made larger to cover the area more fully than carbon nanotubes, and the nanoplatelets are significantly less expensive than single wall carbon nanotubes. The platelets may not require full exfoliation to work most effectively (i.e., there is more contact area through the thickness). It is believed that the electrical resistivity across each platelet is in the range of conductive metals, or can be adjusted, for example, by coating each platelet with a conductive metal.

In another aspect of this invention, metal nanorods/nanowires/nanostrands (collectively called nanowires) can be used in a polymer film, paint or primer to provide lightning strike resistance. Copper, silver, or aluminum nanowires are preferred for their higher conductivity. The nanowires can be added to existing metal screen and polymer or used instead of the metal screen.

In another aspect of this invention, carbon nanotubes or other nanoparticles that have been modified to decrease their inherent electrical resistivity can be added to a film, primer, or paint. For example, entirely gold end-bonded multi-walled carbon nanotubes have substantially higher electrical conductivity than unmodified single-walled carbon nanotubes (Phys. Rev. Lett. 96 057001, which is incorporated herein in its entirety by reference). These modified nanotubes or nanoparticles can be oriented in-plane to replace or reduce the metal screen.

In another aspect of this invention, the carbon nanotubes, graphite nanoplatelets, or other nanoparticles can be made into a paper or felt, for example, using a solvent filtration process. Tackifiers or binders, fibers, or other particles may be used in the paper or felt making process to assist in handling. This nanoreinforced paper or felt can be infused with resin using a prepreg, or liquid molding process, and then the resulting paper or felt formed into a layer of a composite material by shaping the resin-impregnated paper or felt into a desired shape and curing the resin.

In a final aspect of this invention, the carbon nanotubes, graphite nanoplatelets or other nanoparticles can be spun into a yarn or drawn into a film. The yarns can be woven into a fabric or braid or fiber placed onto the prepreg and infiltrated with resin.

The use of carbon nanotubes, the metal powder/carbon nanotube blends, low density metal screens reinforced with carbon nanotubes, metal-coated particles and/or aligned graphite nanoplatelets can provide significant weight savings and/or shortened manufacturing cycles. Ideally, the composite materials provide sufficient lightning strike protection to pass at least a Zone 2A lightning strike test, and, more preferably, can pass a Zone 1A lightning strike test. Also, the materials ideally will have desirable thermal cycling properties for use in aircraft manufacture and use. For example, it is preferred that the surface film, primer coat or paint layer does not microcrack for at least 2,000 cycles when exposed to thermal cycling from −65° F. to 160° F.

These low density materials can be used not only in preparing lightning strike protection materials, such as the exterior of an aircraft and aircraft components, but also in their repair. The use of films, paints and primers including the low density materials described herein in repair applications is easily understood with reference to the detailed description that follows.

DETAILED DESCRIPTION OF THE INVENTION

In accordance with the present invention, a lightning strike protection material is described herein which provides lightning strike protection to composite structures, such as those employed in the aircraft industry.

Figure 1:
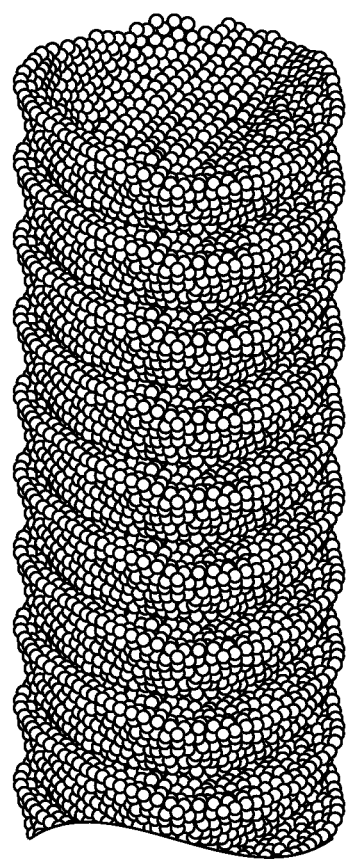
FIG. 1 is an illustration showing a carbon nanofiber (multi-walled Dixie cup configuration).

In one aspect, the material includes a "carbon nanotube-copper" powder comprising copper particles and carbon nanofibers (CNF's), as shown in FIG. 1. In another aspect, the material includes the carbon nanotubes (CNT's) shown in FIG. 2, which CNTs can optionally be plated with a metal such as copper. In either embodiment, the mixture of metal powder and CNF's, or the CNT's, are substantially dispersed on or through a surface film, primer, or paint to form a lightning strike protection material.

The primer or paint comprising either the carbon nanotube-metal powder or the CNT's can be placed on a surface of a composite structure via conventional means, such as spraying, to form the lightning strike protection material. When formed in a surface film, the lightning strike protection material can be cured with the composite structure. The amount of carbon nanotube-copper powder or CNT's on or throughout the surface film or in the primer or paint is of a sufficient concentration to provide a sufficiently low surface resistivity to dissipate the energy from a lightning strike and substantially prevent damage to the plies of the composite structure on which the lightning strike protection material is disposed. The carbon nanotube-metal powder or CNT's can also be added to the polymer with a light-weight metal screen if required.

The carbon nanotube-metal powder- or CNT-reinforced paint, primer, or surface film of the present invention can pass a Zone 1A lightning strike protection requirement and reduce weight in the composite panel. Further, the lightning strike protection material of the invention does not microcrack within at least 2,000 thermal cycles. As compared to conventional materials, replacement of the expanded metal screen by carbon nanotube-metal powder or CNT's can result in a significant weight savings and a shortened manufacturing cycle. These and other aspects of the invention are described in more detail below.

The present invention will be better understood with reference to the following detailed description, and in light of the following definitions.

As used herein, a lightning strike protection material is described herein which provides lightning strike protection to composite structures, such as those employed in the aircraft and aerospace industry. The various airworthiness certification authorities lay down standards to which aircraft manufactures must comply. Based on the probability of a lightning strike and the probable intensity of the lightning current generated in the strike, the authorities designate different potential strike zones for each aircraft and the probable current waveforms to which structures and systems in these zones must be resistant. These are identified as Zones 1A and 1B, Zones 2A and 2B and Zone 3. The zones have been defined in U.S. Pat. No. 5,417,385 and SAE ARP5414, and are well understood by those skilled in the art:

The surface of an aircraft can be divided into a set of regions called lightning strike zones. These zones represent the areas likely to experience the various types of lightning currents and consequently, the various components of the lightning environment. There are three major divisions representing:

1. Regions likely to experience initial lightning attachment and first return strokes.
2. Regions which are unlikely to experience first return stroke but which are likely to experience subsequent return strokes. This will happen where the aircraft is in motion relative to a lightning channel causing sweeping of the channel backwards from a forward initial attachment point.
3. Regions which are unlikely to experience any arc attachment but which will have to conduct lightning current between attachment points.

Regions 1 and 2 are subdivided into specific lightning attachment zones as follows:

Zones 1A and 2A, where long hang-on of a lightning channel is unlikely because the motion of the aircraft with respect to the channel causes the attachment point to move across the surface of the aircraft in the opposite direction from the direction of motion.

Zones 1B and 2B, where the lightning channel attachment point is unlikely to move during the remainder of the flash because the location is a trailing edge or a large promontory from which the relative motion of the aircraft and channel cannot sweep the attachment point further.

Finally, an additional zone, Zone 1C, is defined, in which by virtue of the change in current parameters along a lightning channel and the time taken for sweeping of the attachment point across the surface of the aircraft, the threat to the aircraft is reduced.

Specific zone definitions are as follows:

Zone 1A—First return stroke zone

All the areas of the aircraft surfaces where a first return stroke is likely during lightning channel attachment with a low expectation of flash hang on.

Zone 1B—First return stroke zone with long hang on

All the areas of the aircraft surfaces where a first return stroke is likely during lightning channel attachment with a high expectation of flash hang on.

Zone 1C—Transition zone for first return stroke

All the areas of the aircraft surfaces where a first return stroke of reduced amplitude is likely during lightning channel attachment with a low expectation of flash hang on.

Zone 2A—Swept stroke zone

All the areas of the aircraft surfaces where subsequent return stroke is likely to be swept with a low expectation of flash hang on.

Zone 2B—Swept stroke zone with long hang on

All the areas of the aircraft surfaces into which a lightning channel carrying a subsequent return stroke is likely to be swept with a high expectation of flash hang on.

Zone 3

Those surfaces not in Zones 1A, 1B, 1C, 2A or 2B, where any attachment of the lightning channel is unlikely, and those portions of the aircraft that lies beneath or between the other zones and/or conduct substantial amount of electrical current between direct or swept stroke attachment points.

The location of strike zones on any aircraft is dependent on the geometry of the aircraft and operational factors, and often varies from one aircraft to another. Airworthiness authorities designate standards with which the aircraft manufacturers must comply. Different potential strike zones are assigned for each aircraft component and the current wave component is designated. The structure must be resistant to this strike without penetration through the thickness of the component.

The aircraft components are subjected to thermal cycling during ground to air to ground service. This thermal cycling may cause microcracking within the surface film. This microcracking may extend into the composite structure causing premature failure from exposure to moisture and/or other chemicals. Hence it is desirable to formulate the surface film such that it does not microcrack for at least 2,000 cycles when exposed to thermal cycling from −65° F. to 160° F.

Criteria were developed to formulate nanocomposite films, primers, and paints that would meet the Zone 1A lightning strike and microcracking tests as defined as follows.

Lightning Strike Protection Criteria

Criteria 1—Equivalent Areal Density

Table 1 lists the resistivity of various metals and nanoparticles. Among the metals, silver provides the lowest resistivity, with copper and aluminum next. Nickel and bronze are higher. Nickel and bronze have been used in prior art aerospace structures and components for lightning strike protection; however, the use of these metals typically results in more damage to the carbon/epoxy panel from a lightning strike than the materials described herein.

TABLE 1

Resistivity of Various Materials

| Material | Electrical Resistivity (Microohms/cm) |
|---|---|
| Silver | 1.58 |
| Copper | 1.68 |
| Aluminum | 2.65 |
| Nickel | 6.84 |
| Bronze | 15 |
| Vapor Grown Carbon Nanofiber (VGCNF) | 55 |
| Single Wall Nanotube (SWNT) rope | 100-200 |
| AS4 Carbon Fiber | 1,530 |
| Unfilled epoxy | 5E+12 |

Table 2 lists the material properties of various nanoreinforcement materials. Standard materials, such as aluminum and an epoxy matrix that can incorporate the materials, are also included as a baseline by which to compare the properties of the nanoreinforcement materials.

TABLE 2

Candidate Nanoreinforcement Material Properties

| | Modulus GPa | Thermal Conductivity W/mK | Electrical Resistivity (Microohms/cm) |
|---|---|---|---|
| Carbon nanofibers | 300 | 5-2000 | 50-100 |
| Carbon nanotubes | 1000 | 40-4000 | 2-50 |
| Graphite nanoplatelets | 1000 | 30000 | 50 |
| Silver nanowires | 220 | Around 400 | 3 |
| AS4 graphite fiber | 230 | 20 | 1500 |
| Epoxy matrix | 70 | Insulator | Insulator |
| Aluminum | 70 | 220 | 2.8 |

Table 3 lists various areal densities of lightning strike systems. As shown below, with respect to an aluminum screen system, the areal density of the nanoreinforced systems provide substantially lower areal densities, and, accordingly, significant weight savings compared to aluminum.

TABLE 3

Lightning Strike System Areal Densities

| | Layer | | |
|---|---|---|---|
| | Aluminum screen system areal density (gms) | Nanoreinforced aluminum screen system areal density (gsm) | C-SWNT (10, 10) system areal density (gsm) |
| Total system | 355 | 310 | 135 |
| Weight savings compared to aluminum baseline | | 12.5% | 62% |

One criteria for meeting lightning strike protection is to be equal to, or less than, the minimum areal density of the copper screen baseline. From industry use, 0.029 lb/ft2 (135 gsm) is acceptable as the baseline copper screen areal density with minimal damage to thin skin composite structures typically used in aircraft engine nacelles.

The ratio of the resistivity to density difference can be used to calculate an equivalent areal density screen. For example, assuming the acceptable baseline copper areal density of 0.029 lb/in² (135 gsm), an aluminum areal density is calculated at a factor of 0.5 or 0.015 lb/ft² (70 gsm), where 0.016 lb/ft² (74 gsm) is an acceptable areal density. The lighter density of the aluminum more than offsets the increased resistance compared to copper, resulting in a lighter overall screen. However, this weight advantage is offset by the required heavy fiberglass isolation layer. Since nickel has a similar density as copper, it will require approximately four times the areal density to provide the same lightning strike protection. Silver is slightly more conductive and slightly heavier, so it will require about the same areal density as copper to provide the same lightning strike protection.

Criteria 2—Continuity and Maximum Gap

Another criteria for meeting lightning strike protection is set as a continuity and maximum gap to conduct electricity. The prior art expanded copper screen has sufficient continuity to conduct electricity to the edges of the panel, where it is grounded. It may be possible to have some gap between particles that can be overcome by plasma charging on the surface. The maximum gap, in the 0.029 lb/ft² (135 gsm) copper screen, is 0.125 in. (3.18 mm). This can be used as a guide for setting a maximum gap desired between particles or yarns to less than 0.120 in. (3.05 mm). The resistivity and the aspect ratio of the nanoparticle selected will determine this criteria.

This gap criteria is important when working with particles and especially nanoparticles. Shaw, et al, (2004) On the improved properties of injection-molded, carbon nanotube-filled PET/PVDF blends, *Journal of Power Sources* 136, 37-44 which is incorporated herein in its entirety by reference, reported a 2500% improvement in electrical conductivity by containing CNT's in a polyethylene terphthalate (PET) layer within a blend of polyethylene terephthalate and polyvinylidene fluoride, compared to a well dispersed CNT-filled PET at the same carbon loading. By containing the CNT's within the PET layer, a continuous electrical conductive path is present in the polymer.

Criteria 3—Thermal Cycling and Cracking

Prior art lightning strike protection materials include a metallic screen embedded in an adhesive film. After thermal cycling, cracking in such prior art structure usually occurs at the boundaries of the metallic screen. Microcracking onset can be delayed, for example, by using two films or a film of double the thickness of the screen/film layer in the prior art structure. This cracking can be explained by the weight fraction of the copper screen within the adhesive and the resulting coefficient of thermal expansion mismatch.

The thermal expansion stress, $\sigma^T$ (Equation 1) is also a component of the critical stress, $$\sigma^T = E\alpha\Delta T \quad (1)$$

where $\alpha$ is the CTE, and $\Delta T$ the thermal cycling temperature delta.

The thermal expansion of the screen embedded film, $\alpha_c$, can be estimated using rules of mixture shown in Equation 2, $$\alpha_c = \frac{V_{cu}E_{cu}\alpha_{cu} + V_m E_m \alpha_m}{V_{cu}E_{cu} + (1-V_{cu})E_m} \quad (2)$$

where $V_{cu}$ is the volume fraction of copper, $\alpha_{cu}$ is the CTE of copper, $V_m$ is the volume fraction of the adhesive matrix, and $\alpha_m$ is the CTE of the adhesive matrix. The modulus of the screen embedded film, $E_c$, can also be estimated using rules of mixture.

In contrast, the lightning strike protection materials of the present invention can be designed such that the CTE of the lightning strike protection material, whether in the form of a layer of paint, primer, film, or adhesive, is substantially similar to the CTE of the underlying layer to which it is applied such that cracking is minimized. This can be accomplished, for example, by judicious selection of the low density conductive nanoparticles and polymeric materials described herein. Thus, the materials can provide not only low density conductance, but also minimize cracking observed during thermal cycling. Those of skill in the art can readily select appropriate conductive nanoparticles and polymers to arrive at an appropriate CTE, using the teachings provided herein.

One method of screening materials involves thermal cycling, as follows:

Specimens may be preconditioned at 120° F. and 95% relative humidity. After the initial conditioning, the humidity control is discontinued and the temperature is dropped to −65° F. for a minimum hold. The specimens are then thermally cycled for 30 minutes from −65° F. to 160° F., holding the temperature constant for three minutes at each temperature limit, for a minimum of 400 cycles. The test specimens are then removed and the surfaces examined visually and/or with a die penetrant for cracking. The steps are repeated for a total of five cycling blocks.

The low density electrically conductive layers of the present invention that satisfy these criteria, composite materials, aircraft (and aircraft components) including the composite materials, and methods of making the composite materials, are described in more detail below.

I. Metal Powder/Carbon Nanotube Blends

A. Metal Powders

Any powder can be used that, when present in the matrix material, provides appropriate resistivity at a suitable concentration such that the density of the resulting composite is acceptable. Table 1 lists the resistivities of various metals and nanoparticles.

Among the metals, silver provides the lowest resistivity, followed by copper and aluminum. Nickel and bronze are higher. Although nickel and bronze have been used in aerospace for lightning strike protection, their use typically results in more damage to the carbon/epoxy panels present in many composite materials. For this reason, silver and copper are preferred metals.

The particle size of the metal powders can be between about 4 nm and 100 μm, although the preferred size will vary depending on if the powders are the primary filler, are used with CNT's, or supplement the screen. The selection of particle size and the concentration of the particles in the various primers, paints and/or films described herein are made such that the materials have sufficient low density and conductivity. Those of skill in the art can modify the concentration and particle size to arrive at suitable primer, paint and/or film layers with the desired properties, as described herein.

B. Carbon Nanofibers/Nanotubes

U.S. Pat. No. 6,790,425, the contents of which are hereby incorporated by reference, discloses carbon nanotubes, carbon nanofibers, and thermoset resins, and their use in repair patches for composite structures having a conductive layer. As taught in the '425 patent, composite structures containing a small percentage of nanofibers or nanotubes can be preferred for ensuring conductivity across the surface. From an economic perspective, the use of carbon nanofibers (also known as multi-wall carbon nanotubes) is preferred over the higher cost single wall or double wall carbon nanotubes; however, their conductivity is significantly less. Accordingly, in some embodiments described herein, a relatively large amount of relatively low cost carbon nanofibers is used, providing one amount of conductivity. In other embodiments, a relatively small amount of relatively highly-conductive carbon nanotubes is used, ideally in combination with metal powders or other conductive materials, to provide a relatively equivalent amount of conductivity relative to when higher amounts of less highly-conductive carbon nanofibers are used.

Paints based on solid copper particles have been used in the prior art for lightning strike protection. However, most of these paints do not pass the Zone 1A lightning strike test because they do not meet the gap criteria, but can pass the Zone 2A test.

The carbon nanofibers can be aligned within a surface film, primer or paint, and combined with various metal powders, to provide the composite structure with suitable lightning strike protection. The ratio of metal powder to the copper powder/carbon nanofiber or nanotube combination, by weight, ranges from about 0.2 to 0.999.

While not wishing to be bound to a particular theory, it is thought that the nanotubes aide in meeting the gap requirement discussed herein, with longer nanotubes being preferred. The nanotubes also assist in minimizing microcracking by reducing the matrix coefficient of thermal expansion (CTE), and allowing a lighter surface film to be used.

The paint layer, primer layer, and/or outermost ply of the composite structure can contain carbon nanotubes to the extent that the surface resistivity is low enough to dissipate the energy from a strike without damage to the plies beneath. In addition, the resistivity can be modified not only by adjusting the concentration of carbon nanotubes, but also by the alignment of those nanotubes. Replacing the expanded metal foil of the prior art systems with carbon nanotubes can provide significant weight savings and/or a shortened manufacturing cycle.

The nanotubes can be aligned through various methods, including mechanical, chemical, and magnetic methods. For example, the nanotubes can be mixed with adhesive and extruded into a film coating. The feed screw can be vibrated to improve the alignment of fibers in the flow direction (similar to vibration injection molding used with recycled thermoplastics). The nanotubes can be functionalized to react with the tail or head of each nanotube such that it will self-assemble (similar to lipid bi-layer assembly). This can involve optimizing the nanotube loading so that the nanotubes attract each other, while also ensuring that the thermosetting monomers used to form the layer including the nanotubes (i.e., an epoxy resin) do not interfere with the process. Additionally, the nanotubes can be prepared such that a nickel particle is attached to one end. Ferrous alloy nanoparticles and carbon nanotubes (with the nickel particle) can be added to the adhesive, primer, or paint and subjected to a magnetic field to align the nanotubes.

Carbon nanotubes can be spun into yarns or ropes and woven into fabrics or formed into papers or felts to replace the expanded metal screen.

C. In-Situ Preparation of Carbon Nanotube/Metal Powder Blends

A carbon nanotube-copper composite powder can be prepared by an electrodeposition process using a copper plating bath. The bath contains homogenously dispersed carbon nanotubes. Particles of the composite with a spiky ball structure are accumulated on the plating electrode during the initial stage of electroplating, and can be separated easily to give a carbon nanotube-copper powder. Such a process is described in Arai, S.; Endo, M. (2003) Carbon nanofiber-copper composite powder prepared by electrodeposition, *Electrochemistry Communications* 5, 797-799, which is incorporated herein in its entirety by reference. In the present invention, the nanotubes can be either embedded or not embedded into the copper particles.

II. Combinations of Copper Screen and Carbon Nanoparticles and/or Copper Spiky Balls One can avoid the problems associated with microcracking, caused by stress over a number of thermal cycles, by adding carbon nanoparticles (nanotubes and/or nanofibers) or copper spiky balls to the polymer film and copper screen.

The copper screen is embedded in a layer of a nanoreinforced thermoset adhesive, and cured. The addition of the carbon nanoparticles or copper balls minimizes microcracking due to the decreased CTE of the nanoreinforced surface film such that the CTE of the nanoreinforced surface film more closely matches that of the underlying layer to which it is applied. The closer the match, the less likely the layer is to delaminate and/or crack.

The onset of microcracking is delayed with the addition of an adhesive layer. The volume fraction of copper is approximately 16% for one layer of adhesive. This would be reduced to 8% for two layers of adhesive. This results in approximately half the thermal expansion stress for the two layer adhesive film with screen. However, this significantly increases the weight; hence the addition of nanotubes to decrease the CTE of the adhesive is preferable. As little as 1% by weight of single wall carbon nanotubes can be added to match the CTE of the carbon nanotube reinforced adhesive film to the copper screen. A slightly higher concentration would be required if multi-walled carbon nanotubes and/or copper spiky balls are used.

The concentration of carbon nanotube-copper powder in a paint or primer can be tailored to assist in minimizing the difference in CTE between the paint and the material upon which it is disposed. This can be particularly important in those components where the conductivity required for lightning strike protection is provided by a primer or paint layer. For example, certain components in an aircraft are fastened with hinges, and "conductive" paint can separate from a hinge fastener. If the conductive paint delaminates from the hinges, then the "ground" is lost. One reason why the conductive paint may separate from the fastener during use is that there are coefficient of thermal expansion differences between the fastener and the conductive paint during environmental (hot) use. The use of copper and carbon nanotubes can be tailored to help minimize the mismatch of CTEs.

Another approach is to grow carbon nanotubes onto a light weight expanded aluminum or copper screen.

III. Metal-Coated Microspheres and/or Carbon Nanotubes

Carbon nanotubes can be coated with metals, such as silver, using techniques known in the art. One way to coat carbon nanotubes with silver is electroless plating, as described in Feng and Yuan, J. Mat. Sci., 39:3241-3243 (2004), the contents of which are hereby incorporated by reference.

Typically, carbon nanotubes are pre-treated, for example, by oxidation, hydrophilic treatment, sensitizing treatment, and/or activating treatment because they typically have low chemical reactivity, and do not act as a catalyst for the deposition of metal coatings. The pre-treatment provides activated sites that permit plating of metals such as silver. Other pre-treatment steps that provide such activated sites can also be used.

Oxidation can be performed, for example, using nitric acid. Sensitization and activation can be carried out, for example, by immersing the tubes in an acidic tin chloride solution, rinsing, and then immersing the tubes in an acidic palladium chloride solution. During sensitization, activation, and electroless plating, the reaction mixtures can be agitated using ultrasound. These steps provide the surface of the nanotubes with various functional groups, such as carboxylic acid, ketone and hydroxyl groups.

Electroless plating can provide a metal coating layer on carbon nanotubes roughly 10-20 nm in thickness. The metal atoms aggregate laterally and vertically, to form a continuous layer. When the metal used is silver, the resulting silver-coated carbon nanotubes can be used to provide a low density electrically conductive layer. The aforementioned process can also be used to apply a silver coating on hollow glass micro spheres.

The silver-coated hollow glass microspheres and/or silver-coated carbon nanotubes are present in the primer, paint, film, or adhesive layer in a sufficient concentration such that the surface resistivity is low enough to dissipate the energy from a lightning strike without damaging the plies beneath. Replacing the expanded metal screen used in conventional lightning strike materials with metal-coated microspheres or nanotubes results in significant weight savings and/or a shortened manufacturing cycle.

The density of the microspheres and/or nanotubes is closer to the density of the paint than metal particles. For example, the density of silver-coated microspheres is about 0.126 lb/in$^3$ (3.5 g/cm$^3$) for 70 micron average diameter microsphere with a 5 micron silver coating. Initial calculations predict that 25-35% by volume of silver coated microspheres or silver-coated carbon nanotubes with a surface film at 0.02 lb/ft$^2$ would meet the lightning strike areal density criteria, and the use of large hollow microspheres (i.e., relatively large with respect to the carbon nanotubes) with the carbon nanotubes would help reduce the probability of meeting the gap criteria discussed herein. The use of an ultrasonic horn/roller may be used to help mix and disperse the particles, as well as to help with achieving the desired film thickness.

While not wishing to be bound to a particular theory, it is believed that the silver coating helps with dispersion and increases the adherence of the nanotubes and/or microspheres with the film, primer or paint.

In one aspect of the invention, the nanotubes are combined with a light-weight copper screen. Initial calculations predict that a 10-20% by volume silver coated nanotubes combined with a 0.015 lb/ft$^2$ copper screen with a surface film at 0.02 lb/ft2 would result in a density of 0.05 lb/ft$^2$ and minimize microcracking due to the decreased coefficient of thermal expansion of the nanoreinforced surface film.

IV. Carbon Nanotubes

Since the 10,10 carbon nanotube has a resistivity close to copper and it is six times lighter than copper, it has the highest potential for weight reduction in a lightning strike protection system (~10-20% by weight required in the polymer film for Zone 1A lightning strike protection). However, there are several obstacles that need to be overcome before the benefits can be realized. The first is alignment in-plane may be required to conduct the electricity out to the hinges. The nanotubes may be aligned through various methods. Mechanical, chemical, and magnetic methods can be investigated to align the nanotubes, as described above.

Research by Collins, et al., in *Science*, Vol 292, Apr. 27, 3001, which is incorporated herein in its entirety by reference, found that nanotubes can carry very high current densities and under constant voltage the outer shells of the multi-wall nanotube or single-wall nanotube rope oxidize until the entire structure is oxidized. Hence, not only is the lower resistance of nanotubes preferred over nanofibers, but the current carrying capability of multi-wall nanotubes and ropes of nanotubes are also ideal for lightning strike protection.

Some of the alignment techniques may provide a structure which meets the gap criteria. Another approach to meeting the gap criteria is to embed the nanotubes in a thin layer of thermoplastic within the thermoset or vice versa. A higher loading level of 30 to 55% by weight of single-wall carbon nanotubes should be used to compensate for other chiral configuration tubes (because it is difficult to separate the 10,10 configuration), for damage to tubes from processing, or for random alignment of tubes.

Papers can be made with carbon nanotubes and this will help eliminate gaps within the layer. The papers are generally made using a solvent filtration process and the paper is held together by Van der waals forces between the tubes. However, a resin tackifier can be used in the process to adhere the tubes together as well. These papers can be made with random alignment or they can be made aligned using a high powered magnet.

V. Nano Graphene Plates and Graphite Nanoplatelets

Graphene is the name given to a single layer of carbon atoms densely packed into a benzene-ring structure, and is widely used to describe properties of many carbon-based materials, including graphite, large fullerenes, nanotubes, etc. (e.g., carbon nanotubes are usually thought of as graphene sheets rolled up into nanometer-sized cylinders).

By definition, graphene is a single planar sheet of sp$^2$ bonded carbon atoms. It is not an allotrope of carbon because the sheet is of finite size and other elements appear at the edge in nonvanishing stoichiometric ratios. A typical graphene has the chemical formula $C_{62}H_{20}$. Graphenes are aromatic, and include only hexagonal cells. If pentagonal cells are present, the plane warps into a cone shape, and if heptagon cells are present, the sheet becomes saddle shaped. Planar graphene itself has been presumed not to exist in the free state, being unstable with respect to the formation of curved structures such as soot, fullerenes, and nanotubes.

Graphenes can be prepared by mechanical exfoliation (repeated peeling) of small mesas of highly oriented pyrolitic graphite. Graphenes have interesting electrical properties, with mobilities of up to $10^4$ cm$^2$V$^{-1}$s$^{-1}$, and thus are suitable for use in preparing the composite materials described herein.

The nanoscale graphene plates (NGP's) of one or several layers of graphene plane are sometimes more commonly called graphite nanoplatelets (GNP's) in literature. Graphite flakes are usually exfoliated using ultrasonic energy, and the level of exfoliation can be controlled by adjusting the sonification time.

Graphite nanoplatelets can be oriented in-plane to replace the prior art metal screen in a thermoset polymer electrically conductive layer. Graphite nanoplatelets are less expensive than single wall carbon nanotubes, and can be made in a sufficient size to cover the aircraft or aircraft component surface more fully than carbon nanotubes. Separation of the layers is more desirable than full exfoliation of platelets as there is a higher probability of contact with adjacent platelets, meeting the gap criteria when mixing in a resin to form a film. However, full exfoliation is desired in making highly loaded graphite papers and felts that are subsequently infused with resin.

The graphite nanoplatelet reinforcement may need to be as high as 40-60% by weight in the surface film, primer, or paint to provide Zone 1A lightning strike protection. The platelets should be aligned in-plane and this can be accomplished by vibration (ultrasonic or other mechanical), shear flow, or covalent bonding. They can also be coated with a polymer and aligned using an electric field such as that discussed in U.S. Pat. No. 5,846,356. The graphite nanoplatelets could also be covalently bonded to each other on the edges using technology similar to US Patent Application Publication No. 2005/0069701 for covalently bonding carbon nanotubes to each other. Functional groups can be attached to the graphite nanoplatelet edges and then cross-linked to each other. The cross-linking agent should not be self polymerizable. Care should be taken to ensure that the epoxy matrix is cross-linked to the surface of the platelets as well. If this does not happen then cracking between the layers of platelets can occur which is not acceptable.

The GNP's can be coated in a thermoplastic for alignment or for improving the damage tolerance of the surface of the structure. Polyvinylidene fluoride (PVDF) has been used successfully in US Patent Application Publication No. 2004/0231790 for providing an interpenetrating mechanical bond with 350° F. curing epoxy prepreg. In this patent application, the thermoplastic layer is used for subsequent bonding of composite structures to each other. In this invention it can be used to provide an interlayer between the graphite nanoplatelet (or other nanoparticle) and the epoxy surface film and can also be used for alignment of graphite nanoplatelets with subsequent processing. Other thermoplastics such as PS, PPS, PEI, and PEEK could also be used for this purpose.

VI. Metal Nanorods, Nanowires, and Nanostrands

Metal nanorods/nanowires/nanostrands (collectively called nanowires) can be used in a polymer film, paint or primer to provide lightning strike resistance. Copper, silver, or aluminum are preferred for their higher conductivity. The nanowires can be added to existing metal screen and polymer or used instead of the metal screen. Although the copper or aluminum nanowires may require the same equivalent weight content as the prior art metal screen, it may improve the microcracking resistance from thermal cycling allowing for the use of a lighter weight surface film (0.020 lb/ft$^2$ instead of the conventional 0.030 lb/ft$^2$). The nanowires can be added directly to the resin or manufactured in a veil configuration. The veil would ensure that the gap criteria is met.

VII. Modified Carbon Nanotubes

Carbon nanotubes or other nanoparticles that have been modified to decrease the resistivity can be added to a film, primer, or paint. For example, entirely gold end-bonded multi-walled carbon nanotubes can be used. By bonding metal atoms to the end or sides of carbon nanotubes the electron pathways are increased or made more efficient, hence lowering the resistivity. The equivalent areal density based on the reduced resistivity and the gap criteria discussed herein can be used in designing the concentrations of these modified nanoparticles for Zone 1A lightning strike protection. These modified nanotubes can be oriented in-plane or used within a two-phase polymer as a replacement or in addition to a low density metal screen.

VIII. Primers/Paints/Films which can Include the Low-Density Materials

The low-density conductive materials described above can be present in primers, paints and/or films, and then used to form low-density conductive layers on a composite material. For example, the "carbon nanotube-copper powder" comprising copper particles and/or carbon nanofibers (CNFs) shown in FIG. 1, the carbon nanotubes (CNTs) shown in FIG. 2, with or without metal coating, and the metal-coated microspheres and/or carbon nanotubes, and graphite nanoplatelets can also be dispersed on or within a surface film, primer, or paint to form a lightning strike protection material. The other components of the film, primer and/or paints are described in more detail below.

Thermoset Polymers

The primers, paints and/or films described herein typically include thermoset polymers. Conventional thermoset resin systems which can be used include, for example, epoxy based resin systems, matrices of bismaleimide (BMI), phenolic, polyester, PMR-15 polyimide, acetylene terminated resins, acrylics, polyurethanes, free-radically induced thermosetting resins, and the like. As a result of such considerable choices in thermosetting resins, the primers, paints and/or films of the invention can be tailored as desired. Examples of suitable thermoset resin systems are described, for example, in U.S. Pat. No. 5,470,413, the contents of which are hereby incorporated by reference.

Suitable epoxy resins include those used in established thermoset epoxy/fiber reinforced prepregs used in manufacturing aircraft components. They are frequently based, inter alia, on one or more of diglycidyl ethers of bisphenol A (2,2-bis(4-hydroxyphenyl)propane) or sym-tris(4-hydroxyphenyl)propane, tris(4-hydroxyphenyl)methane, bisphenol, F, tetrabromobisphenol A, their polyepoxide condensation products, cycloaliphatic epoxides, epoxy-modified novolacs (phenol-formaldehyde resins) and the epoxides derived from the reaction of epichlorohydrin with analine, o-, m- or p-aminophenol, and methylene dianaline.

The epoxy resin systems contain epoxy curing agents which cure the resin to solid, infusible products. For this purpose, epoxy curing agents which are acidic, neutral or alkaline may be used. Examples include, among others, amines hardeners, phenols, acid anhydrides, polyamides and Lewis acids and bases. Accelerators may also be used to decrease the cure time and include imidazoles and substituted ureas.

The amount of the hardener employed is usually stoichiometrically equivalent on the basis of one amine group per epoxy group in the resin. Some adjustment of the stoichiometry may be required with the addition of the nanoreinforcement.

The nanoreinforcement can be added to thermoset monomer, hardener, or mixed resin. The method of dispersion will depend on when the nanoreinforcement is added. For example, if the nanoreinforcement is added to a B-staged resin, the high viscosity may require heating and ultrasonic dispersion or high shear mixing. The nanoreinforcement can also be deposited onto the film surface using heat or adhesive to hold it in place during composite processing.

Thermoplastic Polymers

The nanoreinforcement can also be added to a thermoplastic polymer for consolidation with a thermoplastic structure, or bonding with a thermoset structure. Conventional thermoplastic systems which can be used include, for example, polyetheretherketone (PEEK), polyetherketone (PEK), polyphenylene sulfide (PPS), polyethylene sulfide (PES), polyetherimide (PEI), polyvinylidene fluoride (PVDF), polysulfone (PS), polycarbonate (PC), polyphenylene ether/oxide, nylons, aromatic thermoplastic polyesters, aromatic polysulfones, thermoplastic polyimides, liquid crystal polymers, thermoplastic elastomers, and the like.

The nanoreinforcements can be added to the thermoplastic which is then mixed with a thermoset before cure or vice versa. The nanoreinforcements can be added to one thermoplastic which is then mixed with another thermoplastic (e.g., pellets made and then extruded simultaneously).

Primers

Primers enhance the adhesiveness of paint to the composite materials. There are several types of commercially available primers that can be used, and these primers are well known to those skilled in the art. The primers can be water-based, solvent-based, or 100% solids compositions. The term "100% solids" refers to compositions that include virtually no solvent that is not itself polymerizable (i.e., a low viscosity monomer such as methyl acrylate). That is, the resulting layer includes 100% solids, with little or no material evaporating.

One type of primer is a two-part epoxy primer. Epoxy primers provide corrosion protection as well as a bonding surface for most topcoat paints and/or laminate layers. Epoxy primers are preferred when the topcoat paint is a polyurethane, as such paints often are incompatible with other primers.

Paints

The paints used to paint aircraft are largely made up of thermoset polymers. They can include water or volatile organic solvents (VOCs), or be 100% solids compositions. The most common types of paints include enamels, epoxies, acrylates, and urethanes.

Methods of Applying the Primer and/or Paint

The primer or paint comprising the low density conductive material (such as the carbon nanofiber-copper powder described herein) is applied to a surface of a composite structure via conventional means, such as spraying, to form the lightning strike protection material.

For example, the primers and/or paints can be applied using conventional painting methods, such as pressure fed paint guns, High-Volume, Low-Pressure (HVLP) systems, airless spraying, and electrostatic spraying. Airless spraying and electrostatic spraying are used primarily in production work. Airless sprayers force paint through a small tip opening at extremely high fluid pressures (usually 1,200 to 3,600 psi). Electrostatic spray systems charge the paint at the tip. A high voltage difference is set up between the paint and the object to be painted. The charge attracts the particles of paint and they wrap around the object. Conventional systems use a high pressure source, such an air compressor, which delivers about 40-50 psi at the spray gun. The high pressures atomize the paint so that it can be applied to the surface. High-volume, Low-pressure (HVLP) systems use a relatively lower pressure to atomize the paint (3-5 psi). An advantage to this type of system is that overspray is minimized, and most of the paint adheres to the surface being painted. The two main types of HVLP spray systems are the turbine system and the conversion spray gun. In areas where environmental restrictions are enforced, locally mandated application equipment such as HVLP spray guns are highly recommended.

Enamel paints are typically sprayed over epoxy primer after being thinned to proper consistency using enamel thinners. A second type of topcoat paint is acrylic lacquer. Acrylic lacquers have low solids content, which can make them relatively difficult to apply. Acrylic lacquer can be thinned, but thinning increases the amount of VOCs. Polyurethane paint is one of the most popular choices for painting topcoats, because it is durable, provides a high gloss finish, and is relatively chemically resistant. Polyurethane paints have a high solid content (many are 100% solids compositions) and they tend to cure very slowly. Slower cure times allow the paint to flow, which forms a very flat surface that provides a high gloss look. Polyurethane enamels can be mixed with a catalyst prior to use, and their thickness can be reduced to a lower viscosity if they are sprayed. The paint is typically applied at a thickness that provides suitable protection, but which minimizes cracking over time.

Regardless of the type of primer or paint which is used, the primer or paint needs to be properly mixed. This is particularly important where, as here, the primer or paint may include relatively fine metallic particles, such as copper particles, carbon nanoparticles or nanotubes, metal-coated glass microspheres, graphite nanoplatelets, and the like. To ensure that the additives are properly dispersed, the paint can be shaken, for example, on a paint shaker, within one week of application, and ideally is stirred just prior to use.

Often, the paint is mixed with a crosslinking agent (a catalyst) before the paint is applied. Once the catalyst is added, the chemical crosslinking begins, and the window of opportunity to apply the paint opens. The paint may also include retarders and accelerators. Paint retarders are solvents that slow the drying time of the paint, and accelerators speed up the drying time. Accelerators may be required to help the drying process in cool temperatures.

The primer or paint compositions are those that include monomers that polymerize when cured to form thermoset polymers, such that the resulting polymer layer (primer or paint layer) includes the particles substantially dispersed throughout the layer. To aid in dispersing the particles, the surface of the particles can be modified, dispersants can be present in the primer/paint formulations, or the primer/paint formulations can be mixed before application.

When formed in a surface film, the lightning strike protection material can be cured with the composite structure. The amount of nanoreinforcement on or throughout the surface film or in the primer or paint is of a sufficient concentration to provide a sufficiently low surface resistivity to dissipate the energy from a lightning strike and substantially prevent damage to the plies of the composite structure on which the lightning strike protection material is disposed. The nanoreinforced paint, primer, or surface film of the present invention can pass a Zone 1A lightning strike protection requirement and reduce weight in the composite panel. Further, the lightning strike protection material does not microcrack within 2,000 thermal cycles. As compared to conventional materials, replacement of the expanded metal screen by the nanoreinforced material, or incorporating a reduced weight expanded metal screen with nanoreinforcement, can result in a significant weight savings and a shortened manufacturing cycle.

Polymeric Sheets Used to Prepare Laminates

The low-density lightning strike protection can also be provided by placing the various materials, such as the metal powder, carbon nanofibers/nanotubes, metal screen, graphene plates, and the like, into polymeric sheets, which are used as the top-most layer in a laminate material used to fabricate the outer surface of the aircraft and/or aircraft component. The sheets, like the paints and primers, ideally are formed from the thermoset or thermoplastic materials described above. The thickness of the sheets, and the amount of low-density conductive materials present in the sheets, is selected to provide suitable conductivity and density. Ideally, the density of the nanoreinforced sheets is less than about 0.07 lb/ft$^2$, preferably less than or equivalent to 0.05 lb/ft$^2$. The low-density conductive polymeric sheets can be adhered to the laminate using an adhesive layer or preferably cured in-situ with the composite laminate.

IX. Composite Materials Incorporating the Low-Density Conductive Primer/Paint or Sheet The composite materials described herein are conventional composite materials used to prepare aircraft fuselages, aircraft control surfaces, fuselage components, or propulsion system components, except that the metal screen layer typically used to provide lightning strike protection is replaced with a low-density electrically conductive layer.

These composite materials typically include superposed sheets, layers and plies. The outer most layer is typically the electrically conducting layer, and can be in the form of a primer, a paint, or a polymer sheet that includes the various low density conductive materials described herein. Where the electrically conducting layer is a polymer sheet or a primer, it can be covered by one or more primer and/or paint layers.

A composite layer with lower electrical conductivity typically lies beneath the electrically conductive layer. Where the electrically conductive layer is a polymer sheet rather than a primer or paint layer, it is typically cured in-situ with the composite layers or adhered using an adhesive layer. The composite layer is typically a woven fiberglass, aramid, or carbon prepreg, although other fibers can be used, and the layer can also be a non-woven layer.

Additional layers can include various pregregs, fabrics, honeycomb core, foam core, resin and adhesive layers. The structure may be fabricated using dry fabrics which are infused with resin using resin film infusion or resin transfer molding. The electrically conductively layer may also be laid up dry and infused with the polymer during composite fabrication.

Ideally, the nano-reinforced composites have several desirable properties, in addition to lightning strike protection. Examples of such properties include coefficient of thermal expansion that matches that of the underlying material, environmental resistance (i.e., UV, water, fire, and/or fluid resistance), and improved toughness relative to conventional lightning strike materials. Also, the electrical conductivity, thermal conductivity, permeability, friction, wear, cure shrinkage, strength, and stiffness can be improved relative to conventional lightning strike materials. To further add desirable properties, a surface film might also include a scrim backing for ease of handling. The scrim can be a carrier scrim, or a lightweight scrim, either or both of which can be woven or in a mat that includes carbon, carbon nanotubes or nanofibers, fiberglass, aramid, polyester, other thermoplastic fibers, and mixtures thereof.

Figure 4:
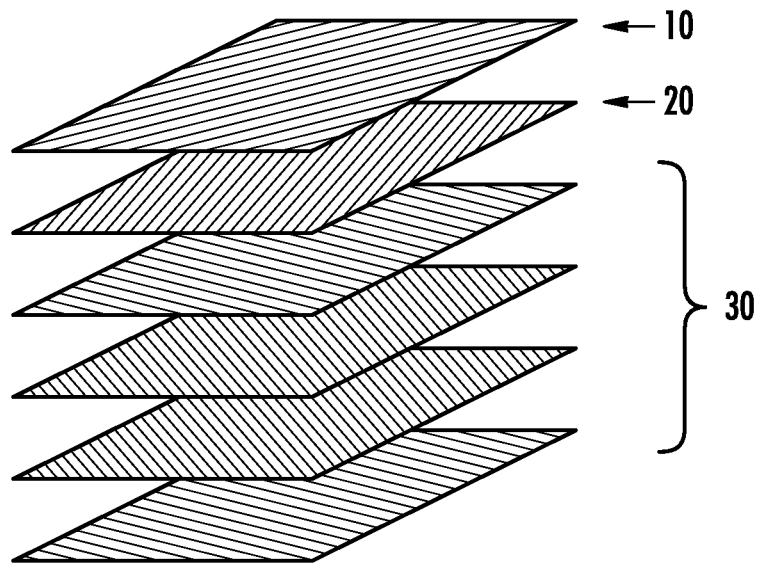
FIG. 4 is an illustration showing conventional lightning strike material in the form of a laminate fabrication.
Figure 5:
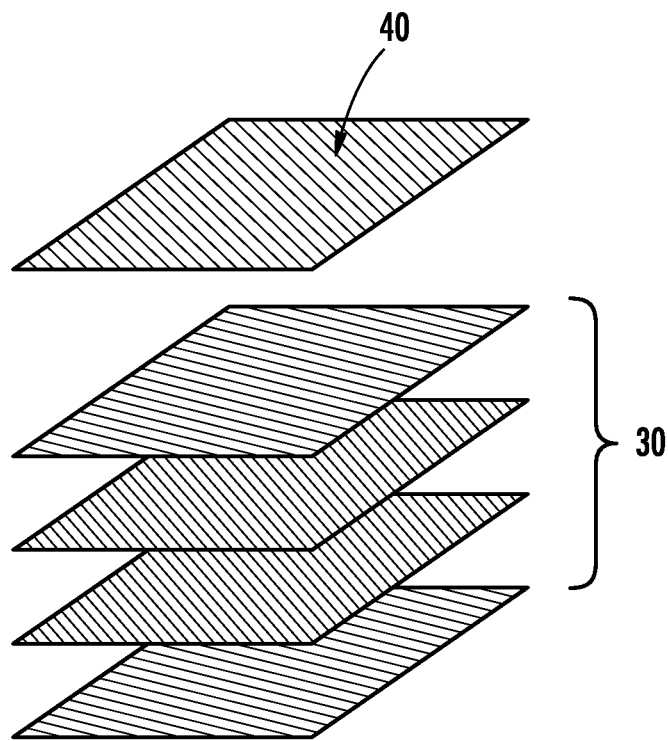
FIG. 5 is an illustration showing the use of nano-reinforcements in a surface layer of a lightning strike composite material.

A comparison between the lightning strike composite materials described herein, and conventional lightning strike composite materials, can be seen in FIGS. 4 and 5.

FIG. 4 is an illustration showing conventional lightning strike material in the form of a laminate fabrication. An aluminum screen (10) in an adhesive layer and a galvanic isolator (20) such as fiberglass, together form a lightning strike protection overlayer. Additional layers underlying the lightning strike protection layer (30) can be, for example, pre-pregged carbon, fiberglass, or aramid fabric (i.e., the structural laminate). The material has a relatively high density, owing to the relatively dense aluminum screen. In contrast, FIG. 5 shows how the nano-reinforcements in the surface layer of the lightning strike composite material can help reduce the overall density. A surface layer incorporating nano-reinforcements (40) forms a lightning strike protection overlayer. As with the prior art approach, additional layers underlying the lightning strike protection layer (30) can be, for example, pre-pregged carbon, fiberglass, or aramid fabric. The layers in the prior art and in the lightning strike protection composite material described herein are similar, except that the elimination of the isolation layer and the relatively low density surface layer effectively lowers the overall density (and, accordingly, weight) of the composite material.

In another embodiment, the nanoparticulates are included in the structural laminate layers, in addition to the surface layer, to impart increased stiffness, enhanced thermal properties, and reduced overall weight. This embodiment can provide relatively improved thermomechanical performance, and greater than 10% weight savings.

X. Aircraft Including the Composite Materials

The composite materials described herein can be used to replace some or all of the composite materials in aircraft components such as nacelles, fuselage, wings, stabilizers, and other control surfaces susceptible to lightning strikes. These components are known to those skilled in the art. For example, nacelles include fan cowls, thrust reversers, inlets, pylons and related systems.

XI. Methods of Preparing the Composite Materials

Methods for manufacturing a composite material including the low-density electrically conductive material described herein are also disclosed. In one aspect of the invention, the methods involve forming a composite material without an electrically conductive layer, and applying one or more of a paint or a primer layer that includes the electrically conductive components, as described herein. Where the primer includes the low density conductive material, the paint overlying the primer may or may not also include a low density conductive material.

Where the material includes a paint or primer layer including the low-density composite materials, the first step involves forming or otherwise obtaining the metal powder, metal-coated microspheres, metal-coated carbon-nanotubes, carbon nanofibers, carbon nanotubes, graphite nanoplatelets and the like, and the other components of the primer and/or paint compositions, and dispersing the low-density conductive materials in the primer and/or paint compositions at an appropriate concentration to provide the resulting primer and/or paint layers with the appropriate conductivity to serve as lightning strike protective materials. The concentration will be expected to vary depending on the level of lightning strike protection that is desired, although Zone 1A is the most desired lightning strike protection. Then, once the material is properly dispersed in the primer or paint, the primer or paint is applied to the remainder of the composite material in a desired thickness.

When the low-density electrically conductive material is in the form of a polymer sheet (or impregnated paper or felt), the methods involve first forming a sheet with the desired concentration of the low-density conductive materials, and then adhering the sheet to the remainder of the composite material, for example, using an adhesive layer or in-situ cure. Unlike the primer and paint compositions, the sheet material can include various components, such as a low density metal screen with the nanoreinforced polymer that cannot be applied using the same techniques (i.e., spraying) that can be used when a sheet material is applied. However, the sheet can include any of the low-density conductive materials that can be used in the paint or primer compositions.

The sheet thickness can range from 0.003 in to 0.010 in, and the thickness can be controlled using known methods for forming polymer sheets, such as calendaring, using a doctor blade, and the like. In those embodiments where a UV-polymerizable material is used, the polymerization can be effected using ultraviolet light, and in other embodiments, the polymerization reaction can be facilitated by exposing the forming sheet to heat. The thermoset sheet can be polymerized in-situ with the thermoset composite layers or adhesively bonded secondarily. A thermoplastic low-density electrically conductive sheet can be heated and pressed with thermoplastic composite layers, or bonded using resistance or ultrasonic welding and the like. The sheet can also be adhesively bonded to thermoset or thermoplastic layers.

The low-density electrically conductive sheet, paper, felt, or the low-density electrically conductive dry nanoreinforced material can be laid up with dry fabric layers or prepreg for subsequent infusion of the polymer using resin transfer molding or resin infusion. The nanoreinforcements can be sprayed onto a carrier using solvent or water which is then evaporated, brushed or distributed on as a powder, and the like when used dry.

When paper or felt-based systems are used, such as graphite oxide paper and silver nanowire paper, any gaps between electrically-conductive nanoparticles can be minimized.

In one embodiment, the nanoreinforcement is added to solvent or other fluid or surfactant to disperse the nanoreinforcements. The mixture can be mixed using ultrasonic or mechanical methods. The suspension is then filtered through a fine mesh and allowed to dry forming a paper. The paper can be used as is or treated further with additional drying or functionalization processes. An example of a paper making process is reported by Gou, J. (2006) Single-walled nanotube bucky paper and nanocomposites, *Polymer International* 55, 1283-1288 which is incorporated herein in its entirety by reference.

In one embodiment, dry carbon fabric performs are sprayed with a mixture of tackifier, graphene nanoplatelets (GNPs), and solvent, and the solvent is allowed to evaporate before resin is infused. The performs are then resin film infused and cured. By using repeated sprayings before the resin is infused, one can obtain relatively high loadings of the GNPs (or other nanoparticulates, which can be applied in a similar manner), for example, up to around 45% by weight.

In another embodiment, a powder spreading machine can be used, where the nanoparticulates are applied in powder form to a fabric, such as a carbon fiber-based fabric, to which a tackifier is added before the addition of the nanoparticles. The powder-applied fabric is then resin-impregnated and cured. High loadings can be achieved in this manner as well.

XII. Repair Applications

Damaged aircraft and aircraft components can be repaired using the materials described herein. For example, a crack can be filled using polymers, such as those described in the paint and primer sections described above, which include low density materials that provide adequate lightning strike protection to the repaired crack. A film including the low density materials can be used to provide a repair to relatively large areas, where a film is most appropriate for use. For smaller areas, and/or cracks, the paint and/or primer described herein can be used.

All aspects of the invention will provide a low-density electrically conductive composite material suitable for use in preparing aircraft and aircraft components with acceptable lightning strike protection, and in repairing such aircraft and aircraft components.

The present invention will be better understood with reference to the following non-limiting examples.

Example 1

Initial calculations predict that 5 to 15% by volume spiky copper balls and carbon nanofibers or metal coated nanofibers or mixtures thereof combined with a low density (e.g. 0.015 lb/ft$^2$) copper screen with a surface film at 0.02 to 0.025 lb/ft$^2$ would meet the lightning strike protection criteria. This would result in an areal density less than 0.055 lb/ft$^2$ (254 gsm), which results in over 10% weight savings compared to prior art lightning strike protection material.

Example 2

Figure 2:
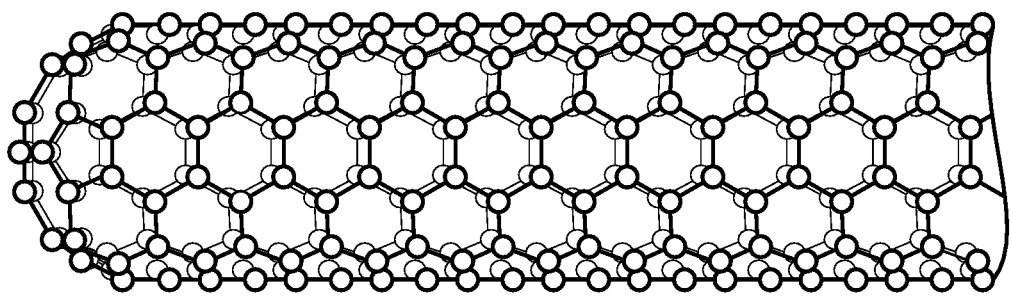
FIG. 2 is an illustration showing single wall carbon nanotube (SWCNT) configurations.
Figure 2:
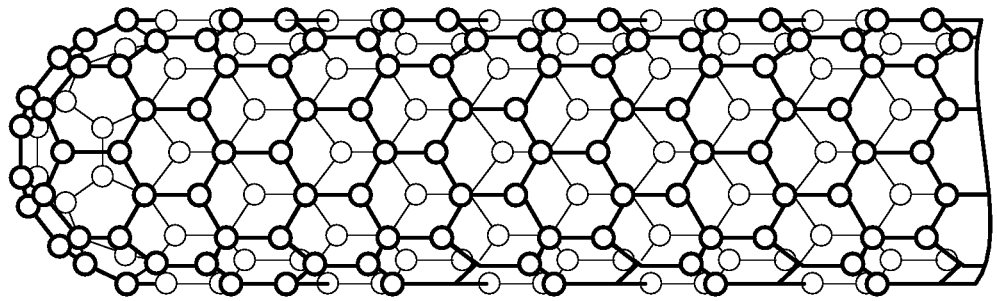
Figure 2:
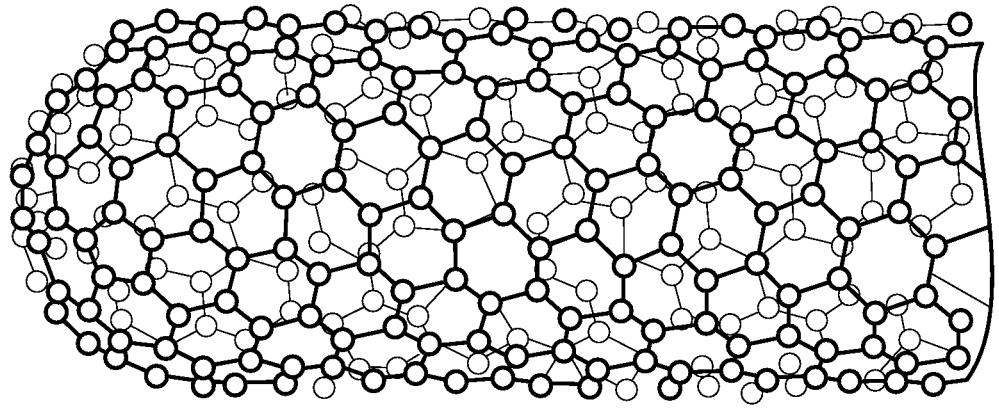
Figure 3:
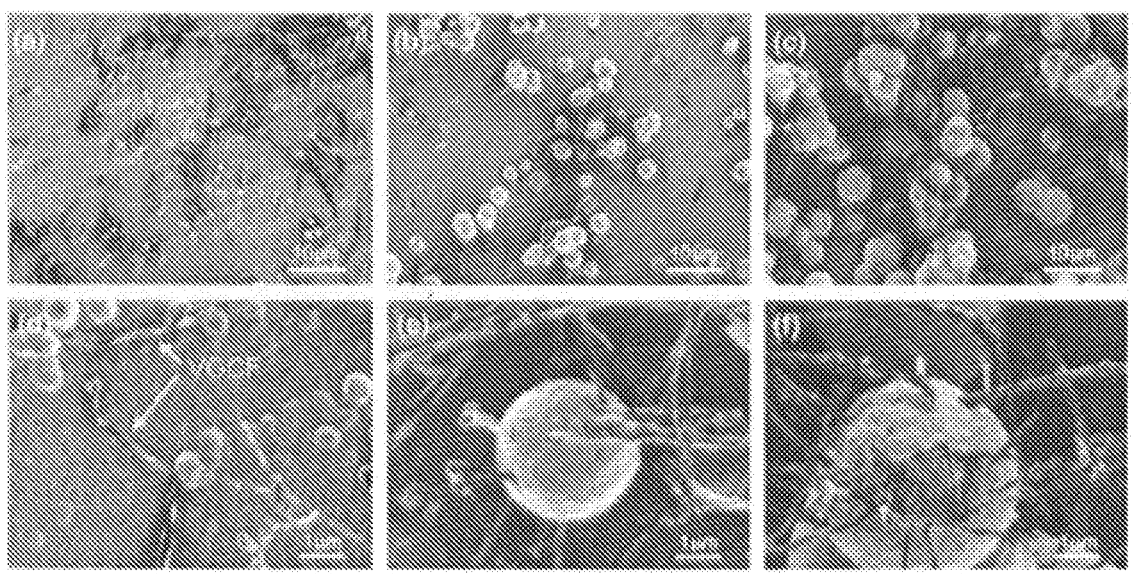
FIG. 3 provides micrographs showing the growth of Cu-VGCF composite particles at: (a) 1 C cm-2, (b) 5 C cm-2, and (c) 15 C cm-2. Enlarged images corresponding to (a)-(c) are shown in (d)-(f). (Reproduced from Arai, S.; Endo, M. (2003) Carbon nanofiber-copper composite powder prepared by electrodeposition, *Electrochemistry Communications* 5, 797-799).

The CTE of a single wall carbon nanotube (SWCNT) shown in FIG. 2 is estimated to be estimated to be as low as $-0.83 \times 10^{-6}/°$ F. ($-1.5 \times 10^{-6}/°$ C.) perpendicular to the tube axis and $-6.7 \times 10^{-6}/°$ F. ($-12 \times 10^{-6}/°$ C.) parallel to the tube axis. As little as 1% by volume of SWCNT is required to decrease the CTE of the surface film close to the CTE of copper. A flattened expanded copper or aluminum screen can be used with the nanoreinforced surface film. The flattened screen will allow for a lighter, thinner film (0.020 lb/ft$^2$ instead of the conventional 0.030 lb/ft$^2$), reducing the weight of the total system. This would also result in over 10% system weight savings compared to prior art lightning strike protection material.

Example 3

Single- or multi-wall carbon nanotubes or mixtures thereof can be added at 15 to 55% by weight to a polymer film to meet Zone 1A lightning strike protection. If aligned 10,10 armchair configuration single wall carbon nanotubes are used the lower range is required and would result in up to 50% weight savings compared to prior art lightning strike protection material. Higher concentrations are required for other chiral carbon nanotube configurations. The nanotubes could be incorporated into a layer of a two-phase polymer or as a paper or felt to ensure the gap criteria is met (e.g., 50% by weight CNT in PVDF with CNT/PVDF layer at 30% to 50% by weight within epoxy). Total film areal density to be between 0.020 to 0.040 lb/ft$^2$.

Example 4

Graphene or graphite nanoplatelets can be added at 30 to 55% by weight to a polymer film (0.020 to 0.030 lb/ft$^2$) to meet Zone 1A lightning strike protection. The nanoplatelets should be expanded but not fully exfoliated to ensure connectivity. Fully exfoliated nanoplatelets could be incorporated into a layer or a two-phase polymer or a paper- or felt-based system. This would result in over 10% weight savings compared to prior art lightning strike protection material.

The foregoing is illustrative of the present invention and is not to be construed as limiting thereof. The invention is defined by the following claims, with equivalents of the claims to be included therein. All patents and publications referred to herein are incorporated by reference in their entirety, for all purposes.

We claim:

1. A film for providing a desired level of lightning strike protection to a composite or metal substrate, the film comprising carbon nanoparticle yarn infiltrated with resin, wherein the carbon nanoparticles comprise carbon nanotubes, the carbon nanotubes are aligned through mechanical or chemical methods, the yarn is in the form of a braid disposed on the surface of the substrate, the maximum gap between adjacent yarns is less than about 0.120 inches (3.05 mm), and the yarn is present at a loading level that provides Zone 1A lightning strike protection.

2. The film of claim 1, wherein the carbon nanoparticle yarn further comprises graphite nanoplatelets.

3. The film of claim 2, wherein the graphite nanoplatelets are structurally aligned through vibration, shear flow, or covalent bonding.

4. The film of claim 1, wherein the carbon nanotubes are aligned through optimizing the nanotubes to react with the tail or head of each nanotube such that it will self-assemble into alignment.

5. The film of claim 1, wherein the carbon nanotubes are aligned through vibration extrusion techniques.

* * * * *